(12) United States Patent
Turner

(10) Patent No.: US 12,741,759 B2
(45) Date of Patent: Sep. 22, 2026

(54) RADICAL LATCH INTERFACE SYSTEM

(71) Applicant: MACDONALD, DETTWILER AND ASSOCIATES INC., Brampton (CA)

(72) Inventor: Andrew Paul Turner, Burlington (CA)

(73) Assignee: MACDONALD, DETTWILER AND ASSOCIATES INC., Brampton (CA)

( * ) Notice: Subject to any disclaimer, the term of this patent is extended or adjusted under 35 U.S.C. 154(b) by 681 days.

(21) Appl. No.: 17/618,646

(22) PCT Filed: Jul. 2, 2020

(86) PCT No.: PCT/CA2020/050922
§ 371 (c)(1),
(2) Date: Dec. 13, 2021

(87) PCT Pub. No.: WO2021/000047
PCT Pub. Date: Jan. 7, 2021

(65) Prior Publication Data

US 2022/0297859 A1 Sep. 22, 2022

Related U.S. Application Data

(60) Provisional application No. 62/869,943, filed on Jul. 2, 2019.

(51) Int. Cl.

| | |
|---|---|
| ***B64G 1/64*** | (2006.01) |
| ***B25J 15/04*** | (2006.01) |
| ***B64G 1/42*** | (2006.01) |
| ***B64G 4/00*** | (2006.01) |

(52) U.S. Cl.
CPC ............ *B64G 1/64* (2013.01); *B25J 15/0433* (2013.01); *B64G 1/428* (2013.01); *B64G 4/00* (2013.01); *B64G 2004/005* (2013.01)

(58) Field of Classification Search
CPC ...... B64G 1/64; B64G 4/00; B64G 2004/005; B64G 1/428; B25J 15/0433
See application file for complete search history.

(56) References Cited

U.S. PATENT DOCUMENTS

| | | | |
|---|---|---|---|
| 4,929,011 | A | 5/1990 | Vandersluis et al. |
| 5,320,395 | A | 6/1994 | Gernhardt et al. |
| 5,439,310 | A | 8/1995 | Evenson et al. |

(Continued)

FOREIGN PATENT DOCUMENTS

| | | | |
|---|---|---|---|
| CA | 1294997 | C | 1/1992 |
| CA | 2789117 | A1 | 8/2011 |

(Continued)

OTHER PUBLICATIONS

International search report for parent PCT/CA2020/050922 dated Oct. 1, 2020, 3 pages.

*Primary Examiner* — Victor L Macarthur
(74) *Attorney, Agent, or Firm* — HILL & SCHUMACHER

(57) ABSTRACT

The present disclosure relates to a low mass system for releasably securing a robotic arm to a spacecraft and also securing various payloads to the robotic arm and to each other, permitting the robotic arm to be both moved from one location to another suitably equipped location on a spacecraft to another and to allow the free end of the robotic arm to be secured to any payload also similarly equipped such that this payload may be manipulated by the robotic arm.

15 Claims, 27 Drawing Sheets

(56) References Cited

U.S. PATENT DOCUMENTS

| | | | |
|---|---|---|---|
| 2013/0103193 A1 | 4/2013 | Roberts et al. | |
| 2019/0168395 A1* | 6/2019 | Hay | B64G 1/6462 |

FOREIGN PATENT DOCUMENTS

| | | |
|---|---|---|
| CN | 103386688 A | 11/2013 |
| FR | 2902472 A1 | 12/2021 |
| WO | 2019104448 A1 | 6/2019 |

* cited by examiner 10
12
14
16
18
20
24
40
50
52
60
70
72
90
114
260
1B 616
84
80
82
626
624
620
622
628
618

RADICAL LATCH INTERFACE SYSTEM

CROSS-REFERENCE TO RELATED APPLICATIONS

This application is a National Phase of PCT Application No. PCT/CA2020/050922, filed on Jul. 2, 2020, and published on Jan. 7, 2021 as WO 2021/000047, in English, which claims priority to U.S. Provisional Patent Application No. 62/869,943, filed on Jul. 2, 2019, all of which are incorporated herein by reference in their entirety.

FIELD

The present disclosure relates to a low mass system for releasably securing one end of a robotic arm (or any other selected object) to a purpose-built attach point on a spacecraft, permitting the robotic arm (or selected object) to be moved from one purpose-built attach point location on the spacecraft to another and to allow the free end of the robotic arm (selected object) to be secured to any payload also similarly equipped such that this payload may be manipulated by the robotic arm or connected to the selected object.

BACKGROUND

The use of robotics within the context of space operations is well known. Also well known is that one of the overriding constraints of space operations is low mass to reduce the costs to launch objects into space. Efforts to introduce commonality into space system interfaces enhance interoperability and also reduce overall spacecraft mass and complexity, thus reducing the costs to develop and operate these space systems in both the short and long term.

The benefit of any robotic system is greatly enhanced if its mounting point or base can be moved from place to place so that it may act wherever needed with as few limitations as possible. A robotic system or arm that can move itself from location to location within its environment creates a further benefit. This benefit has been realized before in systems such as the Space Station Remote Manipulator System (SSRMS) currently operating on the International Space Station (ISS). The SSRMS' purpose-built attach points are Power Data Grapple Fixtures (PDGF's) which are located at various locations around the ISS, providing a mechanical attach point, as well as power, data and video connections to the manipulator via its Latching End Effectors (LEE) which are located at either end of the seven (7) jointed SSRMS.

One of the special conditions of activities in space is the microgravity environment. Of special interest with respect to robotic arms is that within a microgravity environment a robotic arm need no longer account for the effects of Earth gravity which can result in the two ends of a robotic arm being designed with identical structural capacities without excessive mass penalties. This would not be the case under Earth gravity where the base of an arm, analogous to a human shoulder, must be significantly stronger, and therefore heavier, than the wrist or hand of an arm. The ability to make the two ends of an arm similar in terms of structural capability permits the concept of an arm that may self-move, end over end-wise, or "walk", from one prepared location to another on the spacecraft. In such a case, because of the number of these prepared locations, reducing their mass and complexity reaps significant benefits to the entire spacecraft system.

In addition, the benefits of any robotic system can be enhanced by increasing the number of objects the robotic system can interface with or grasp and subsequently manoeuvre. This can be achieved, to a degree, by creating an interface system where that portion of the interface that is to be replicated most often is also of the lowest possible mass and of the least size and complexity, thereby reducing the overall mass and cost burden on the complement of objects to be handled by the robotic system and encouraging more objects to be compatible with the robotic system.

If the interface at the base of a robotic arm can be the same as the interface between the robotic arm and any object being handled or acquired and then maneuvered, the benefits are multiplied yet again.

SUMMARY

Disclosed herein is low mass system for releasably securing one end of a robotic arm (or any other selected object) to a purpose-built attach point on a spacecraft, permitting the robotic arm (or any other selected object) to be moved from one purpose-built attach point location on the spacecraft to another and to allow the free end of the robotic arm (or any other selected object) to be secured to any payload also similarly equipped such that this payload may be manipulated by the robotic arm.

This system and mechanism that releasably and structurally permits a robotic arm to be mounted to a spacecraft or attach a payload to the free end of the manipulator facilitates both the movement of the robotic arm from one place to another via a network of passive interface locations on the spacecraft and provides for the low cost and low mass releasable attachment of various payloads to the robotic arm Additionally this system and mechanism shall, with a single actuator and in one continuous motion, achieve capture, alignment, seating, electrical connection and latching of the interface by means of 3 or more latches arranged in radial planes which interact with the rim of the passive interface. An embodiment disclosed herein provides a mechanism for releasably mounting a robotic arm to a spacecraft and to payloads that the arm might acquire, manoeuvre and insert or remove from mounting locations on the spacecraft. The method of mounting the arm to the spacecraft is especially designed to permit the arm to be moved, under its own power, from mounting point to mounting point around the spacecraft in order to provide robotic services at various locations around the spacecraft. To that end, all of the active or driven components of the system are contained within that portion of the system that is permanently attached to the robotic arm, termed the "active interface assembly". The portions of the system attached to the host spacecraft or any payloads contain no mechanisms that are independently driven, and are termed the "passive interface assembly" and need not contain any electrical connections unless used as a mounting base for the arm or unless the payload itself requires power and/or data connections to keep it heated or to provide data via the arm to the other computer systems on the spacecraft.

The active portion of the interface contains the latching mechanisms that hold the active and passive portions of the interface together thus providing the structural load carrying capacity necessary for the robotic arm to perform useful tasks.

Thus there is provided an interface coupling system for releasably securing one end of a robotic arm (or any other selected object) to a purpose-built attach point on a spacecraft, permitting the robotic arm (or any other selected object) to be moved from one purpose-built attach point on the spacecraft to another and to allow the free end of the robotic arm (or any other selected object) to be secured to any payload also similarly equipped such that this payload may be manipulated by the robotic arm, comprising:

a) an active interface assembly including an outer housing including a flat interface coupling located at its proximal end for structurally attaching it to the robotic arm or selected object, electrical conduits for receiving electrical cables from said robotic arm or selected object, a rotary actuator coupled to said outer housing and connectable to said robotic arm or selected object, a stepped interface coupling at its distal end having alternating raised and lowered sections arranged radially on the coupling face at equal intervals, an inner housing having a proximal end coupled to said rotary actuator and having pivoting attachments located at its distal end to three or more radial latches, said attachments to said radial latches being arranged in a single plane, equally spaced and oriented tangential to the outer diameter of said inner housing, each radial latch including a compressible strut sized to produce a tuned interface preload, each latch having a coupling to said inner housing, active side electrical connectors compliantly mounted within said inner housing and connected to electrical systems on said robotic arm or selected object;

b) a passive interface assembly having a proximal and distal end including;

a stepped interface coupling located at its proximal end complementary to said stepped interface of said active interface assembly for structurally attaching said passive interface assembly to said active interface assembly, a clamping rim configured to be engaged and clamped by said radial latches, said stepped interface coupling including alignment guides complementary to said radial latches, a flat interface coupling located at its distal end for affixing said passive interface assembly to a desired object, and passive side electrical connections configured to mate with the electrical connections in the active interface assembly and configured to support preselected operational requirements of the passive interface, and wherein upon coarse alignment by the robotic arm of the active interface assembly with said passive interface assembly to within a capture envelope of the said active interface assembly and upon activation of said rotary actuator said inner housing is driven towards the passive interface assembly in a single continuous motion such that said radial latches latch onto said rim to achieve capture, alignment, seating, electrical connection of said first and second electrical connections and latching of the active and passive interface assemblies.

A further understanding of the functional and advantageous aspects of the disclosure can be realized by reference to the following detailed description and drawings.

BRIEF DESCRIPTION OF THE DRAWINGS

Embodiments of the mechanism for releasably securing a robotic system or arm to a spacecraft or payload will now be described, by way of example only, with reference to the drawings, in which:

FIGS. 6A to 6F show selected operational stages involved in the mating of the active interface assembly 12 to the passive interface assembly 12 when in use, in which:

FIG. 6A shows the ready to latch stage once the active interface assembly 12 has been maneuvered into position by the robotic arm and sufficiently aligned with respect to the passive interface assembly 14 to initiate the action of the active interface assembly;

FIG. 6B shows the contact stage (also termed capture stage) of the active interface assembly 12 in contact with the passive interface assembly 14;

FIG. 6C shows the seated stage in which the active interface assembly 12 has been seated in the passive interface assembly 14;

FIG. 6D shows the maximum load position of the active interface assembly 12 with respect to the passive interface assembly 14 during coupling;

FIG. 6E shows the relative position of the active interface assembly 12 with respect to the passive interface assembly 14 when the connectors of the active and passive sides 118 and 72 are fully mated in it's self-locked configuration; and FIG. 6F shows the active interface assembly 12 fully mated with the passive interface assembly 14.

DETAILED DESCRIPTION

Figures 1A, 1B:
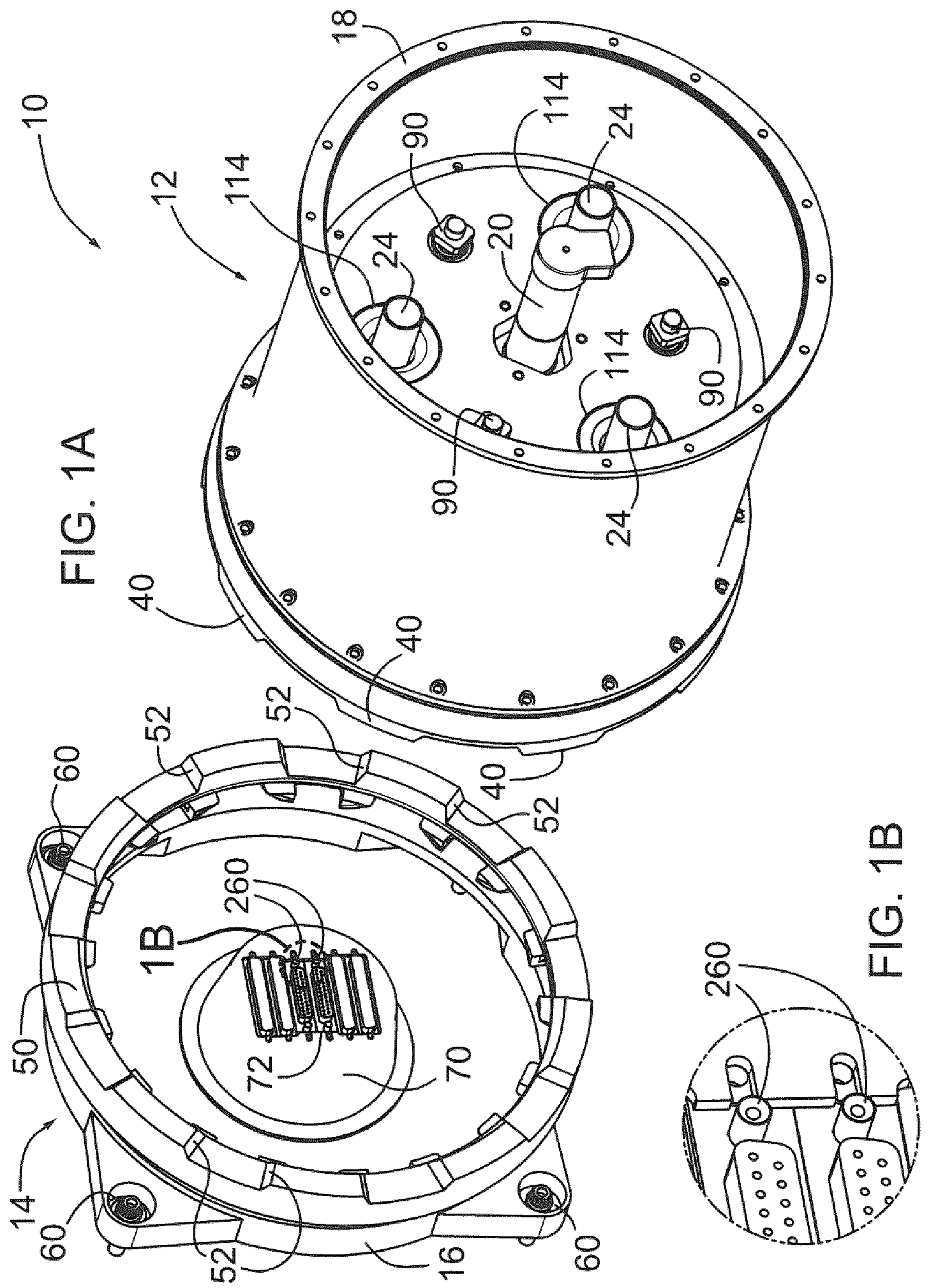
FIG. 1A is a perspective view of the mechanism 10 for releasably securing a robotic system or arm to a spacecraft or payload comprised of an active interface assembly 12 and a passive interface assembly 14 constructed in accordance with the present disclosure.
FIG. 1B shows a passive side connector alignment guide 260.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Embodiments of the active-passive interface system comprise the following components in reference to the Figures.

PARTS LIST

10—both active and passive interface assemblies separated;
12—active interface assembly;
14—passive interface assembly;
16—passive interface housing;
18—fixed outer active interface housing;
20—rotary actuator;
24—inner cable guide
40—active face coupling interface flange
42—active coupling contact surface
50—passive face coupling interface flange
52—passive coupling contact surface
60—passive interface mounting bolt, washer and thermal bushing
70—passive interface connector housing
72—passive side electrical connector
74—latch alignment guide
80—rocker arm
81—radial latch
82—compressible strut
84—latch roller
86—bushing
88—latch roller pin
90—ballscrew
92—ballnut
94—locknut
96—bearing
100—mobile inner housing
102—drive gear
104—idler gear
110—outer cable guide
114—outer cable guide flared opening
118—active side electrical connector
120—cable housing
122—cable cover
124—inner housing end stop
126—idler housing
128—idler shaft
130—link pivot pin
140—strut clevis
142—strut lug
144—strut sleeve
146—spring
148—screw
150—washer
160—drive housing
162—drive plate
164—actuator adapter
166—actuator pinion
168—pinion spacer
170—needle bearing
172—thrust washer
174—bearing retainer
176—bearing spacer
190—connector mounting plate
192—sleeve
194—spring
196—washer
198—washer
200—locknut
202—screw
210—bushing
212—rocker pivot pin
220—connecting pin
230—mobile inner housing 100 axis
240—fixed outer active interface housing 18 axis;
250—active side connector alignment feature
260—passive side connector alignment feature
300—payload
500—robotic arm
510—spacecraft
520—earth
530—radio communication
610—both external active and passive interface assemblies;
612—external active interface assembly;
614—external passive interface assembly;
616—external passive interface housing;
618—external active interface housing;
620—mobile outer housing
622—drive ramp
624—drive roller
626—drive link
628—kick ramp
630—kick roller
632—linear bearing
634—bolt driver
636—passive interface drive bolt
710—both externally driven active and passive interface assemblies;
712—externally driven active interface assembly;
714—externally driven passive interface assembly;
716—externally driven passive interface housing;
718—externally driven active interface housing;
720—driveshaft
722—worm
724—wheel Structure Passive Interface Assembly 14

Figures 2A, 2B:
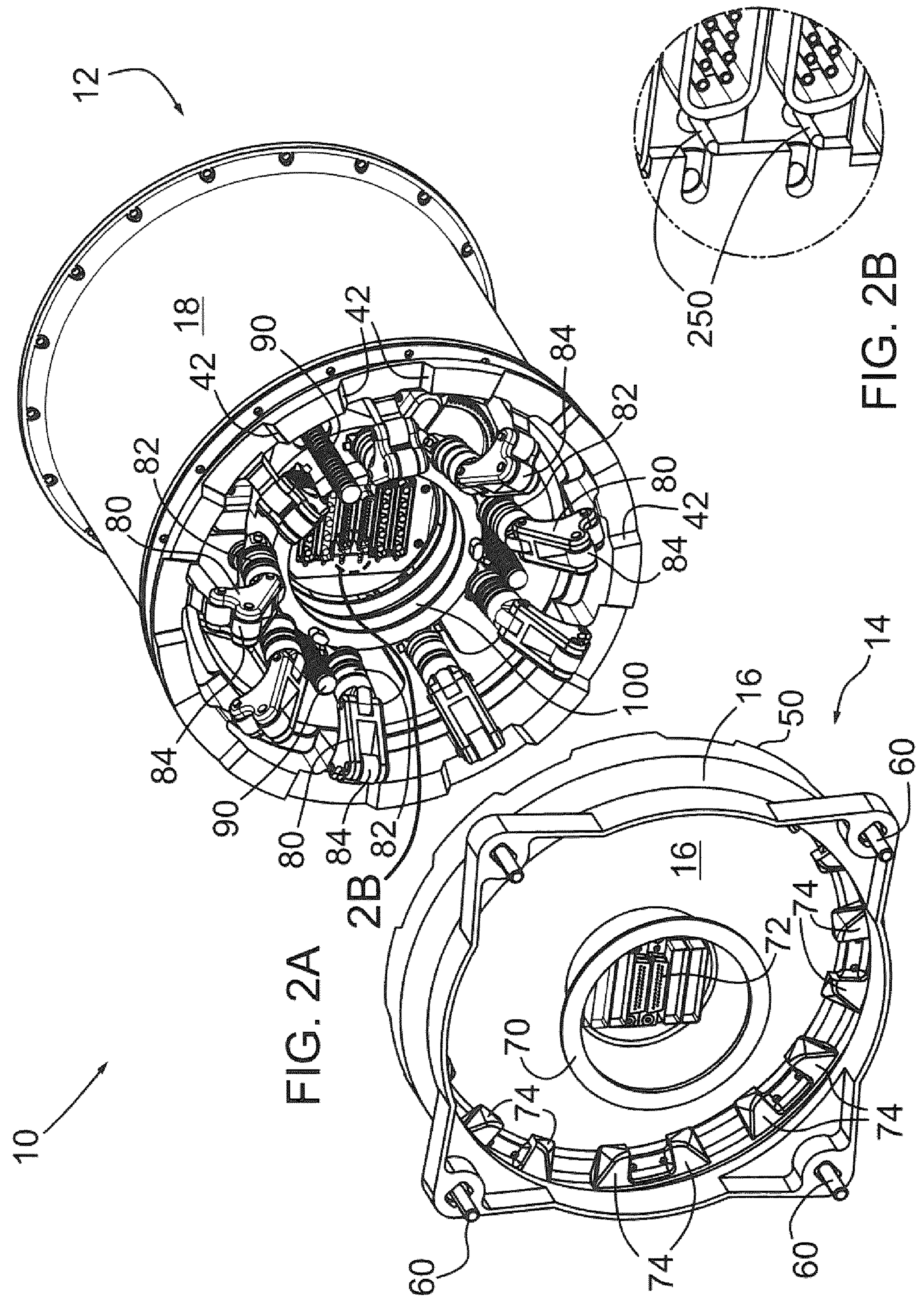
FIG. 2A is a perspective view of the mechanism 10 of FIG. 1, but taken from a different perspective than shown in FIG. 1 showing the coupling mechanism located in the active interface assembly used to rigidly couple the active interface assembly 12 to the passive interface assembly 14 when in use.
FIG. 2B shows active side connector alignment guide 250.

Referring to FIGS. 1A and 2A, a passive interface assembly 14 comprises a passive interface housing 16 with multiple alignment guides 74, multiple passive interface mounting bolts, washers and thermal bushings 60, passive interface connector housing 70 and multiple passive side electrical connectors 72. The passive interface housing 16 includes a passive face coupling interface flange 50 having alternating raised sections 52 and lowered sections arranged radially on the coupling face at equal intervals. The inclined faces between the raised sections 52 and lowered sections are the contacting surfaces of the passive face coupling interface flange 50. Passive interface mounting bolt, washer and thermal bushing 60 are mounted in four (4) housing sections 58 forming part of passive interface housing 16. Passive interface mounting bolt, washer and thermal bushing 60 are used to bolt passive interface assembly 14 to either a payload to be handled by the robotic arm or a surface intended to support the robotic arm as a base of operation, such as a spacecraft deck. Passive interface connector housing 70 is mounted concentrically within passive interface housing 16. Passive side electrical connectors 72 are mounted within the passive interface connector housing. Passive side electrical connectors 72 may include power, data and/or video connectors, depending on the end use application of the interface assembly.

Alternatively, a custom arrangement of electrical contacts could be used to optimize the use of the central volume and/or accommodate other devices such as cameras, lights or other sensors. For passive interfaces that will be used as a robotic arm base of operations the electrical contact arrangement is suited solely to the needs of the robotic arm. For passive interfaces on payloads the electrical contact arrangement may be suited to the needs of the payload, for example to receive power and/or exchange data, notwithstanding that the active side electrical connectors must be a common standardized arrangement suitable to the needs of the robotic arm and all payloads to be handled.

Visible in FIG. 2A are alignment guides 74 spaced around the periphery of passive interface housing 16. An alignment guide 74 is required in each of the spaces between radial latches 81 (to be discussed herein after) when mated, so that the latch roller 84 and rocker arm 80 can interact with the shaped guiding surfaces to continually reduce the lateral offset and roll (angular) offset of the active and passive interface assemblies 12 and 14 respectively as the radial latches 81 move through their closing stroke.

Active Interface Assembly 12

Referring to FIG. 1A and FIG. 2A, active interface assembly 12 comprises a fixed outer active interface housing 18, a translating mobile inner housing 100, three or more radial latches 81 consisting comprised of a rocker arm 80, a compressible link 82, a latch roller 84, bushing 86 and latch roller pin 88 arranged in radial planes with pivoting connection to both the fixed outer active interface housing 18 and translating mobile inner housing 100, a rotary actuator 20 and mechanism to drive the translating motion, and multiple active side electrical connectors 118 mounted to a connector plate 190 on compliant spring mounts.

Located at the distal end of fixed outer active interface housing 18 is an active face coupling interface flange 40 having a series of alternating raised and lowered sections arranged radially on the coupling face at equal intervals. The inclined faces between the raised and lowered sections 42 are the contacting surfaces of the active face coupling flange 40. At the proximal end of active interface assembly 12, recessed within fixed outer active interface housing 18, is drive plate 162 mounted normal to said longitudinal axis and supported by drive housing 160. As such drive plate 162 and drive components supported thereon are out of the primary structure load path for the robot arm and hence immune to any effect that might be caused by external loads on the robot arm.

Drive plate 162 defines axes for the actuator 20, idler gears 104 and drive gears 102 to which ballscrews 90 are mounted. While actuator 20 is depicted coaxially with drive plate 162 alternative gear arrangements would facilitate an off-center location, rendering the central space of drive plate 162 available for a large hole suitable for the passage of cable or for other purposes such as limit switches or other sensors.

Three additional openings in drive plate 162 accommodate outer cable guides 110 with flared openings 114. Inner cable guides 24 protrude through the proximal end of outer cable guides 110 when the mobile inner housing 100 is fully retracted. Flared openings 114 in outer cable guides 110 ensure cables, being pulled into outer cable guides as inner housing 100 translates forward, have a generously curved surface to guide them. Inner cable guides 24 nest within outer cable guides 110 to provide a telescoping port for cable passage. Motion of cables resulting from the translating motion of mobile inner housing 100 will be accommodated in the annulus between the actuator 20 and the fixed outer active interface housing 18 after passing through inner and outer cable guides. The rotary actuator 20 includes a motor providing continuous torque at high rotational speed coupled to a gear head (to reduce the speed and increase the torque) and a sensor to control motor commutation and report rotation of the drive axis.

Figure 3:
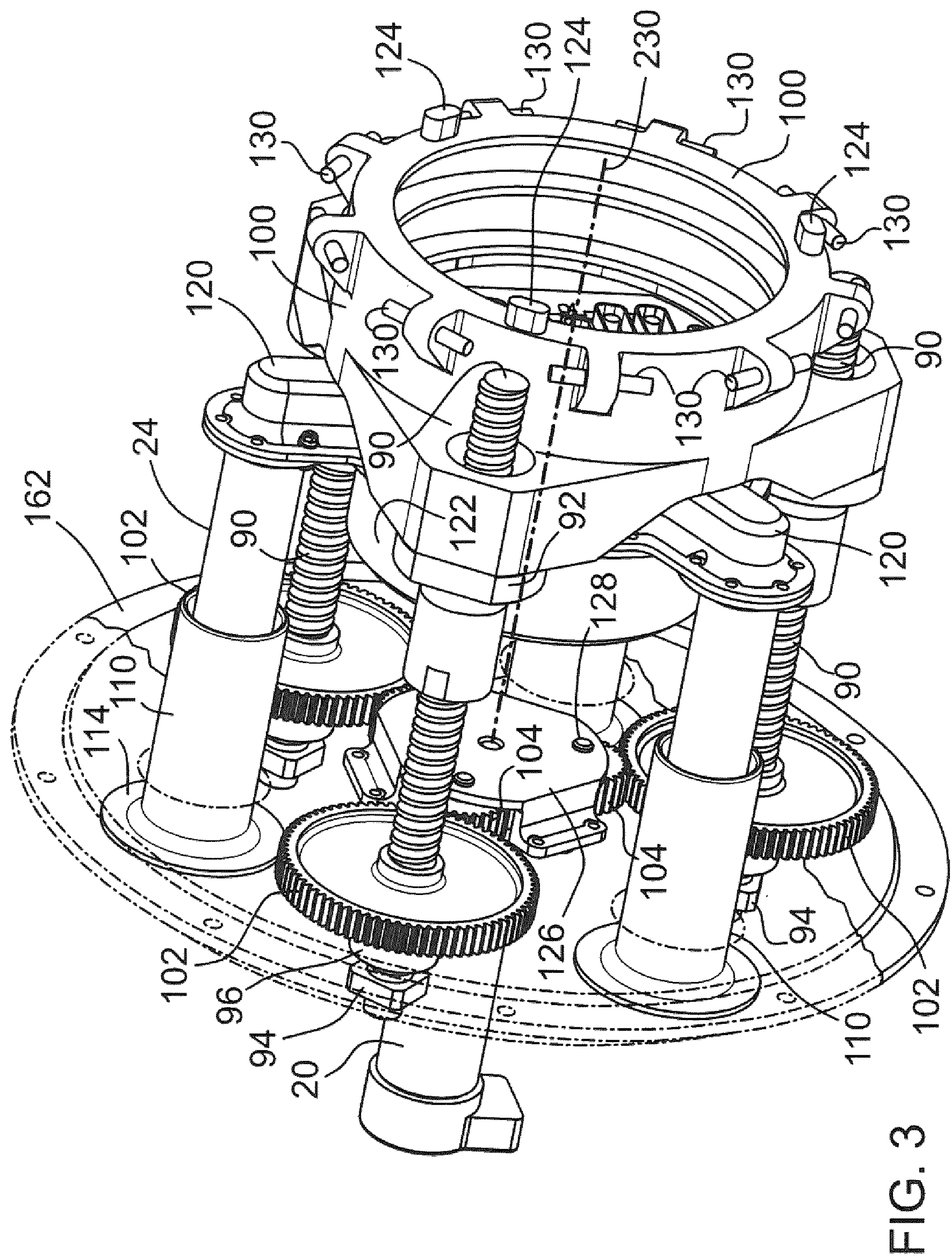
FIG. 3 is a perspective view of the active interface assembly 12 inner housing portion 100 and drive system used to mate the active interface assembly 12 to the passive interface assembly 14 when in use.

FIG. 3 shows the components related to linear actuation. The assembly of mobile inner housing 100, cable housing 120, cable cover 122, ballnuts 92 and inner cable guides 24 is translated along the mobile inner housing axis 230 when torque is delivered to the ballscrews 90 via actuator 20, actuator pinion 168 (see FIG. 6A), idler gears 104 and drive gears 102. Inner housing 100 is fitted with link pivot pins 130 at the distal end. Each link pivot pin 130 provides the attachment point for one end of a radial latch compressible strut 82. Three pads 124 on inner housing 100 come into contact with the mounting surface of passive interface assembly 14 at end of travel.

Figure 6A:
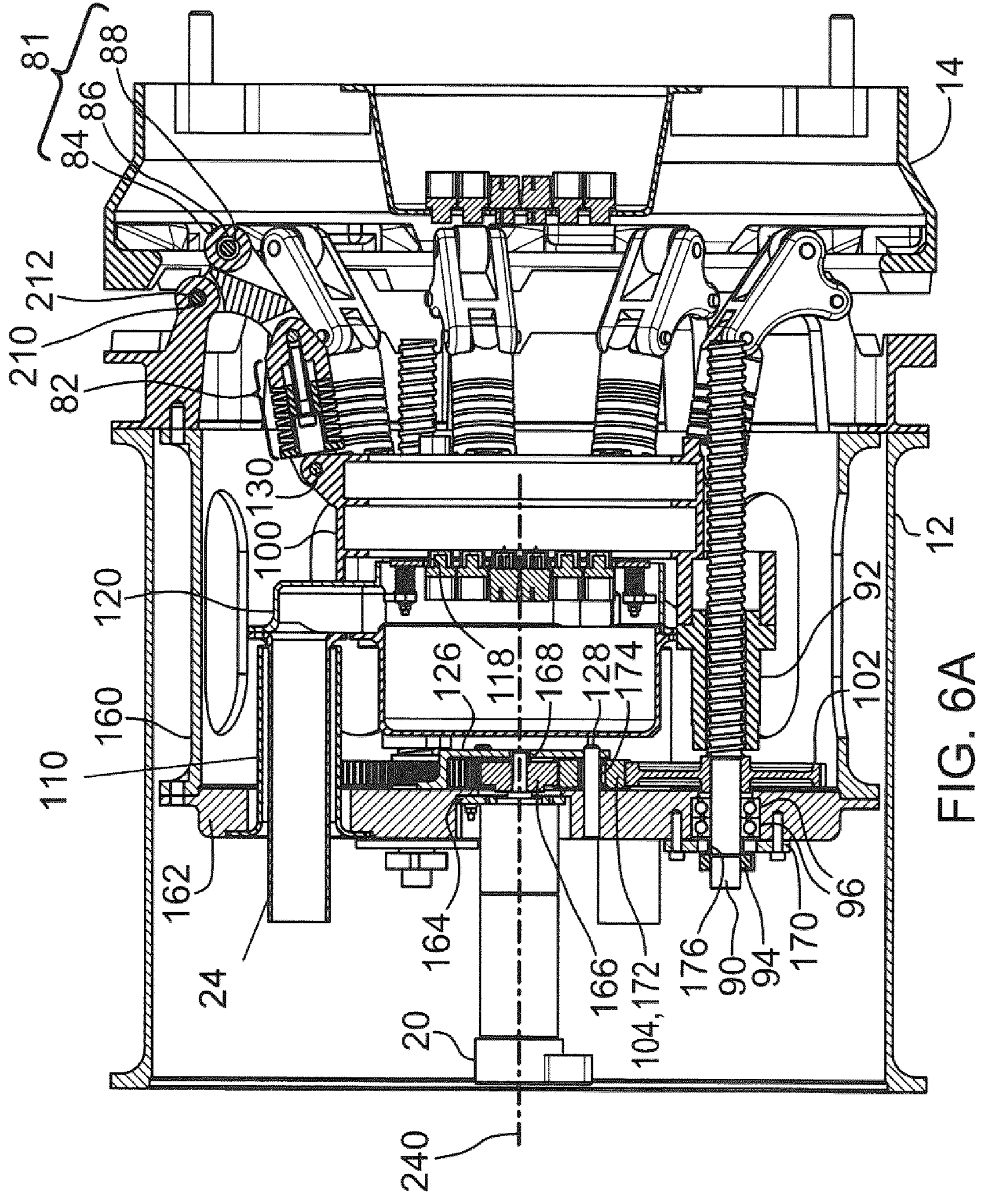

More detail is visible in FIG. 6A wherein actuator 20 is mounted to drive plate 162 via actuator adapter 164. Idler housing 126, when mounted to drive plate 162, constrains axial motion of actuator pinion 166 and idler gears 104 via pinion spacer 168 and thrust washers 172, the latter placed one on each side of each idler gear. Thrust washers 172 and pinion spacer 168 may be adjusted at assembly to achieve a loose running fit. Each idler gear 104 runs on a needle bearing 170 which permits free rotation on idler shaft 128.

Each ballscrew 90 is fitted with a drive gear 102 and mounted to the drive bracket 162 via bearings 96. Bearing spacers 176, which may be adjusted at assembly, are placed on each side of the bearing set. Locknut 94 clamps drive gear 102, bearing spacers 176 and inner races of bearings 96 onto ballscrew 90, while bearing retainer 174 clamps outer races of bearings 96 to drive plate 162.

Figure 4A:
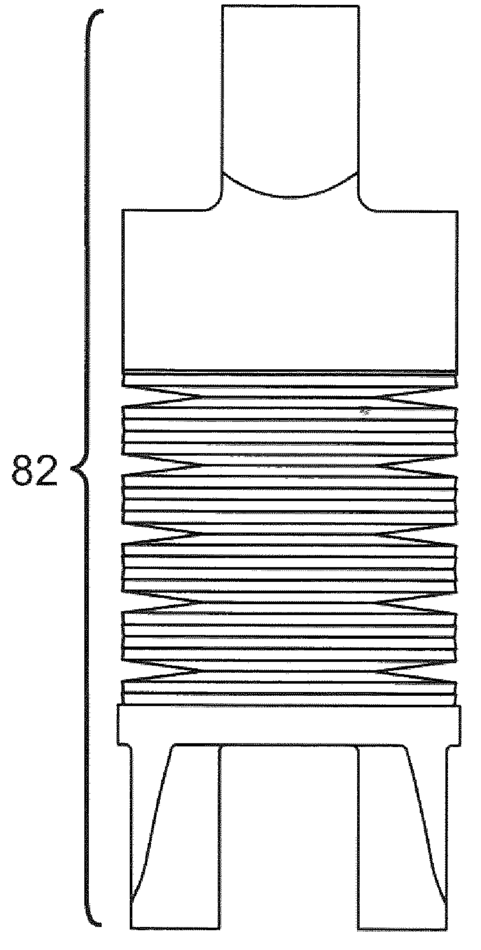
FIG. 4A is an orthographic view of the compressible strut 82 which forms a connection between the inner housing 100 and each rocker arm 80.
Figure 4B:
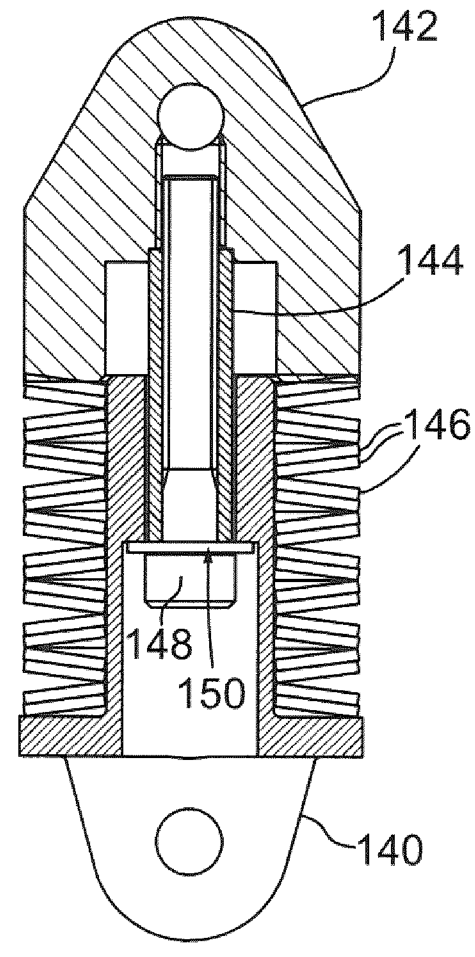
FIG. 4B is a section view of the compressible strut 82.

FIG. 4A shows compressible strut 82 in its extended state. FIG. 4B, a cross section of compressible strut 82, shows screw 148 and washer 150 clamping sleeve 144 onto strut lug 142 while attaching strut clevis 140 to strut lug 142. Springs 146, shown in this embodiment nested in pairs which are stacked in series, can be selected and configured to give the desired preload at the interface when fully mated.

Figure 5:
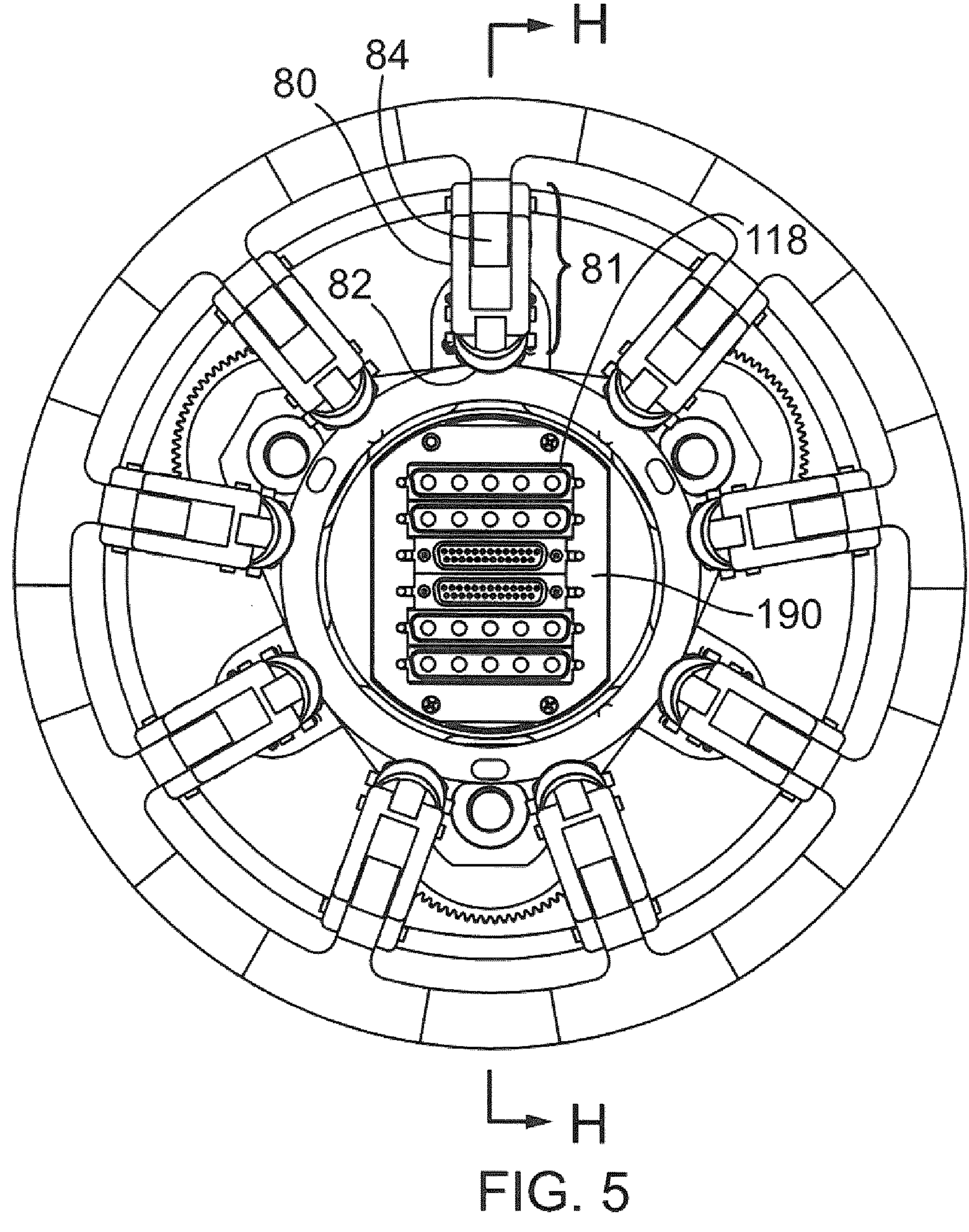
FIG. 5 is an orthographic view of the active interface assembly 12 showing the equally spaced radial arrangement of latches, the spacing of ballscrews and an example of the active side electrical connectors 118.

FIG. 5 shows the distal end of the active interface assembly. Radial latches, as noted above, each comprised of rocker arm 80, latch roller 84 and compressible strut 82, are arranged in evenly spaced radial planes (9 in this embodiment). Active side electrical connectors 118 are mounted to connector plate 190.

Figure 7:
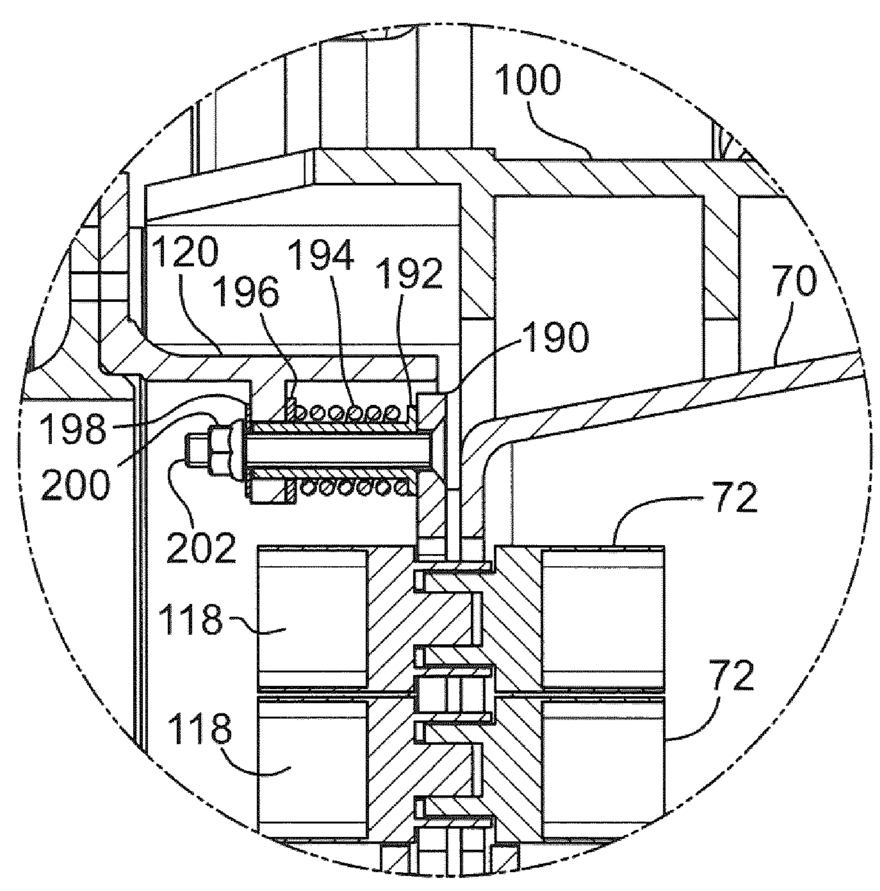
FIG. 7 shows an arrangement for compliant mounting of the active side connectors 118.

FIG. 7 shows compliant mounting of connector plate 190 to cable housing 120. The arrangement of sleeve 192, spring 194 and washer 196, allows connector plate 190 to remain stationary during the final increment of forward motion of cable housing 120 via its attachment to mobile inner housing 100. Locknut 200, screw 202 and washer 198 ensure the sleeve remains rigidly attached to connector plate 190. FIG. 7 shows one of three (3) or more such spring/sleeve arrangements. Compliant mounting of the connectors allows the mechanism end of stroke to be somewhat decoupled from the end of stroke of connector mating, thus preventing the connectors from being overloaded by the actuation force applied to mobile inner housing 100.

Figure 8:
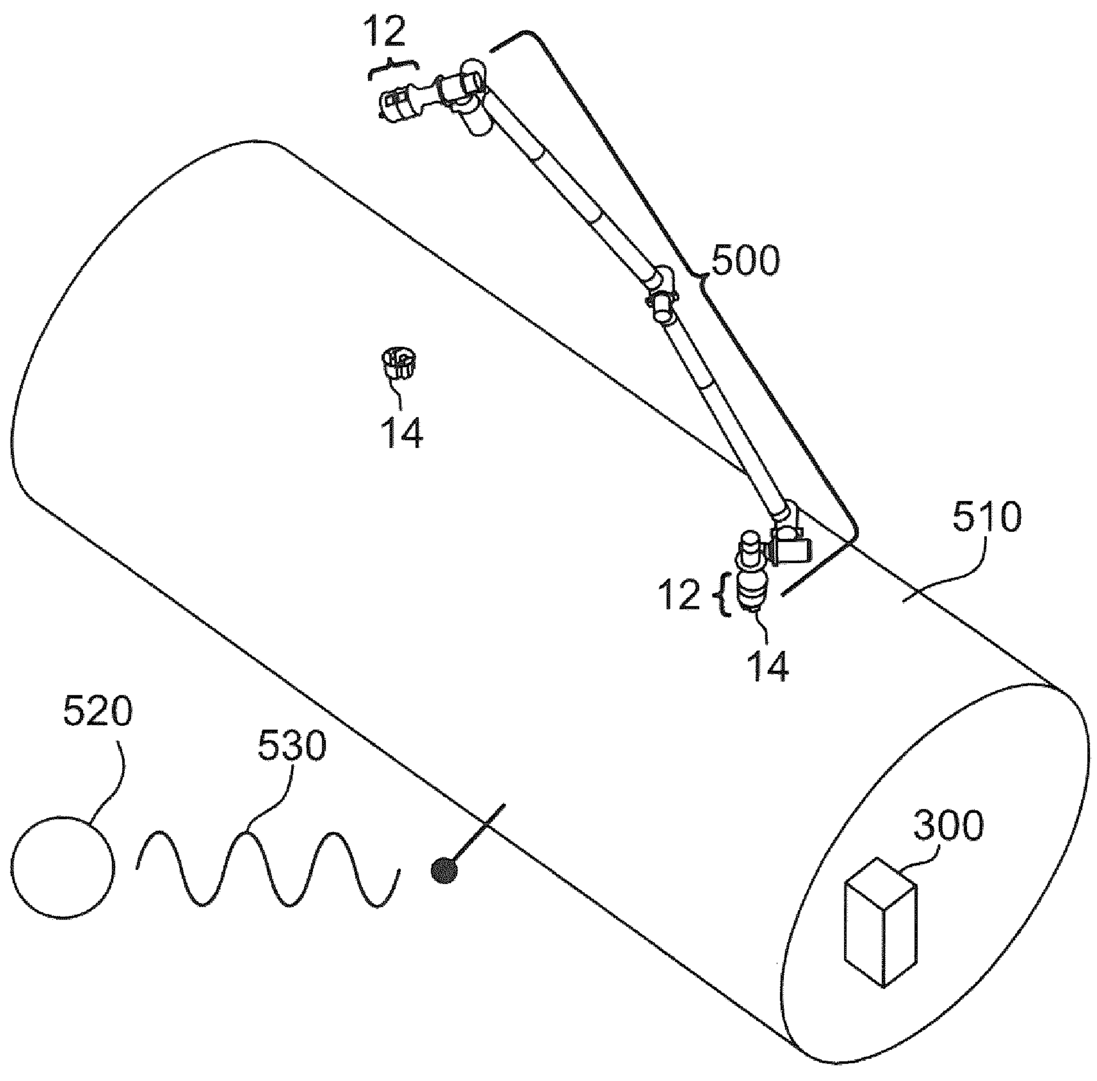
FIG. 8 depicts the operational scenario of robotic arm relocation.

FIG. 8 shows the robotic arm 500, with a first active interface assembly 12 on its proximal end attached to a passive interface assembly 14 mounted on spacecraft 510 and a second active interface assembly 12 on the manipulators distal end positioned above a second passive interface assembly 14 on the spacecraft 510. When the robotic arm 500 is operated from a ground station, commands are relayed from earth 520 to the spacecraft 510 via radio communication 530.

Figure 9:
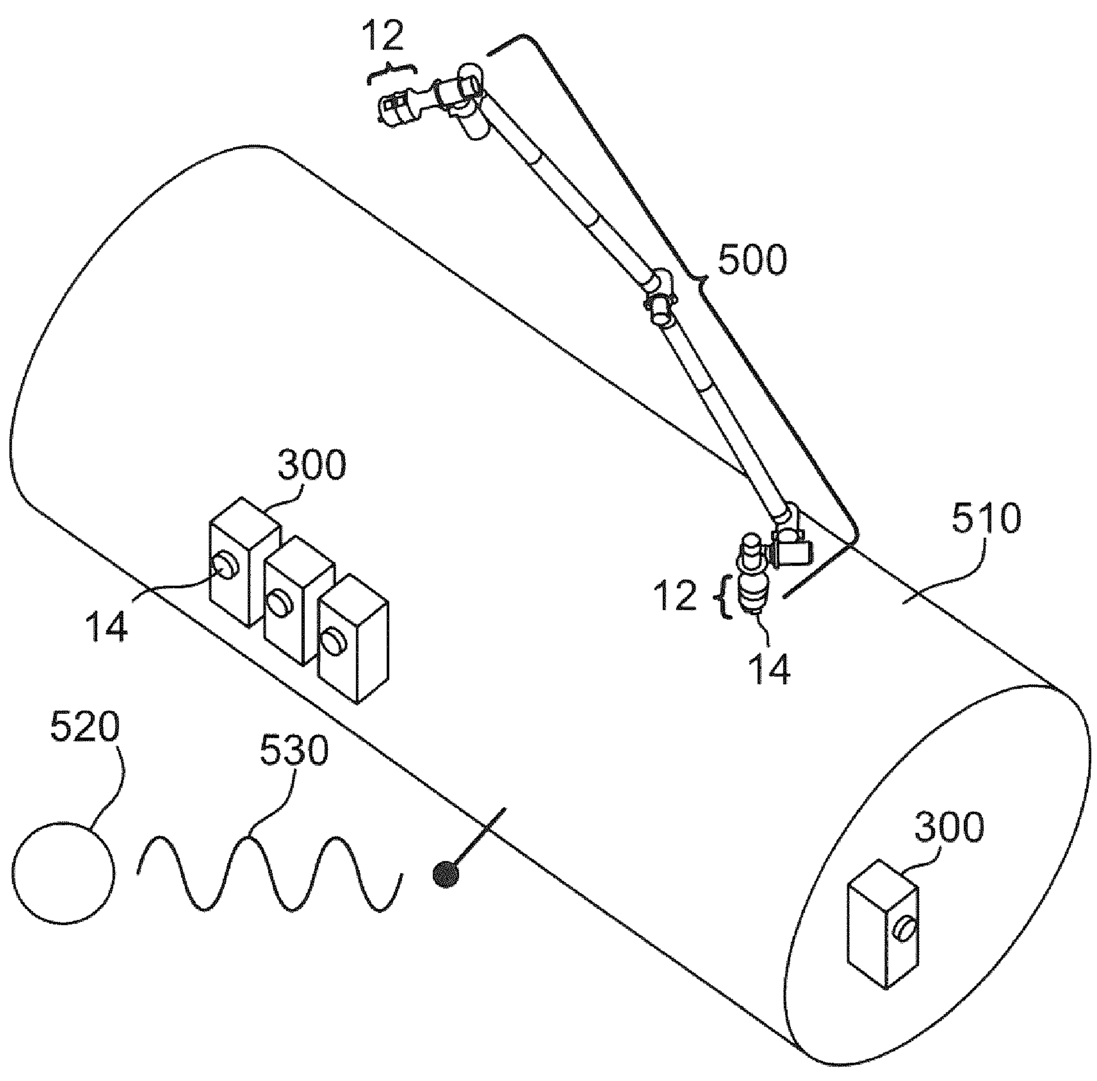
FIG. 9 depicts the operational scenario of manipulation of a payload or other object.

FIG. 9 shows the robotic arm 500, with a first active interface assembly 12 on its proximal end attached to passive interface assembly 14 mounted on spacecraft 510 and a second active interface assembly 12 on the manipulators distal end positioned a number of payloads 300, of which each has passive interface assembly 14 mounted on them.

In operation as shown in FIGS. 8 and 9, the active interface assembly 12 mounted at the free end of the robotic arm 500 would be coarsely aligned with the passive interface assembly 14 which in turn is secured at its proximal end to the object to be coupled to the robotic arm. Said object could be the spacecraft 510 or payload 300. The active and passive interface assemblies 12 and 14 respectively are coarse aligned by the robotic arm 500 with respect to each other sufficiently to ensure they will meet "tooth" to "space" at their face couplings in the correctly indexed position for the active side 118 and passive side 72 connectors to eventually engage. This coarse alignment is accomplished via one or more of several means of manipulator control. A human operator can teleoperate the motion of the free end of the robotic arm 500 towards the passive interface assembly 14 with the aid of a camera (not shown) using either a target (not shown) mounted on or adjacent to the active interface assembly 12. In another embodiment the manipulator motion can be performed automatically where a computer vision system mounted on the robotic arm aligns the interface assemblies through viewing one or more landmarks mounted on one or both of the active and passive interface assemblies. While the capture capability of the interface can be adjusted as discussed above, the current embodiment with 3,200 Nm moment capacity and 340 mm outer diameter can close the interface with lateral offset of 2.5 cm, roll and wobble (angular) offsets of 2.8 degrees and combinations thereof to the extent allowed before first contact occurs. This allows for closing of the interface with residual errors commensurate with existing visual servoing systems.

The operation of mating the active interface assembly to the passive interface assembly will now be described with reference to FIGS. 6A to 6F. Each of the FIGS. 6A to 6F illustrates a point of significance in the operational cycle and each point is a particular state in the mating process. Advancing from one state to the next is achieved by energizing the rotary actuator 20 and driving mobile inner housing 100 forward towards the passive interface assembly 14 which in turn is mounted on a selected object. The actuator 20 transmits torque through the actuator pinion 166, delivering torque to the drive gears 102 via the idler gears 104. The drive gears 102 are mounted to, and deliver torque to the ballscrews 90. Each of the corresponding ballnuts 92 are mounted to the mobile inner housing 100 such that they are prevented from rotating. The three rotating ballscrews 90, working in unison, drive the inner housing 100 forward. The action of the three rotating ballscrews 90, in conjunction with the coplanar arrangement of link pivot pins 130 at the distal end of mobile inner housing 100, ensure the inner housing axis 230 remains aligned to the fixed outer active interface housing axis 240.

Figure 6B:
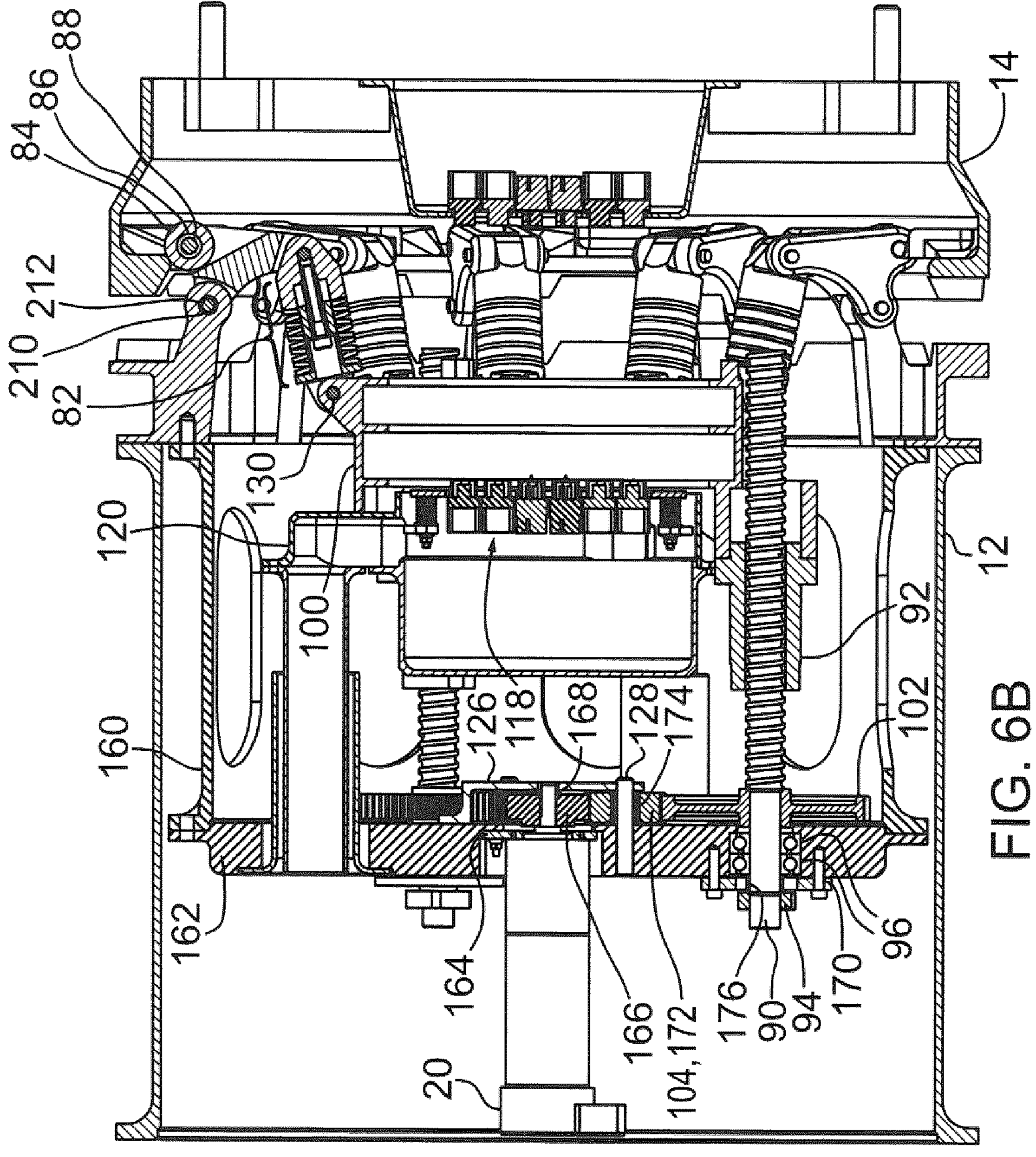

FIG. 6A shows the ready-to-latch state in which the mobile inner housing 100 is fully retracted. The latches (each comprised of rocker arm 80, compressible strut 82 with springs 146 and latch rollers 84) are fully open, allowing for the maximum permissible misalignment between active interface assembly 12 and the passive interface assembly 14. For illustrative purposes, the passive interface assembly 14 is shown fully aligned with the active interface assembly 12, except fora separation of about 25 mm. The capture envelope is also tolerant of lateral offset, roll and wobble (angular) offsets although these are not shown in this illustration. FIG. 6B shows the contact state in which the mobile inner housing 100 has advanced along axis 240 sufficient for the radial latch rollers to contact the inner rim of the passive interface. While this illustration shows all the latch rollers 84 contacting simultaneously, this would more commonly occur sequentially when additional initial coarse alignment errors are introduced. Regardless of the number of latch rollers 84 in contact, and regardless of inner housing position when contact first occurs, continued motion of the radial latches from this point will force the seating of the interface. The roll alignment guides 74 on the underside of the peripheral rim of the passive interface assembly 14 interact with the radial latch rocker arms 80 and latch rollers 84 to achieve coarse roll and lateral alignment of active and passive interface assemblies 12 and 14 respectively. This ensures that the teeth of the active and passive face coupling flanges 40 and 50 on active interface assembly 12 and passive interface assembly 14 respectively engage correctly before fully seating. As the mechanism progresses through its closing stroke, latch rollers 84 collectively form a continually expanding diameter interacting with both the peripheral rim of the passive face coupling interface flange 50 and alignment guides 74. When the collective diameter of the latch rollers 84 exceeds the inner diameter of the peripheral rim, capture is complete.

Figure 6C:
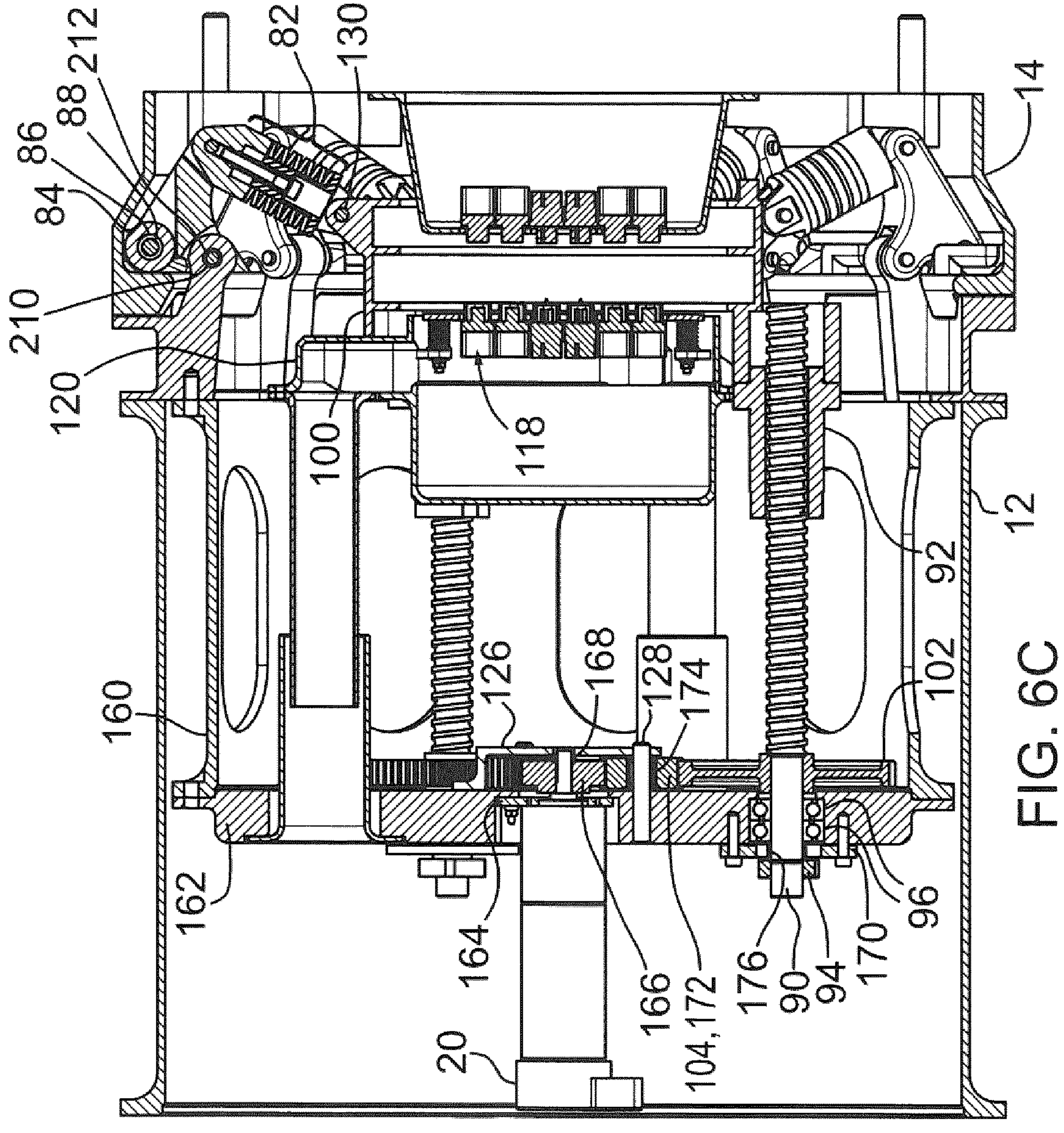

FIG. 6C shows the seated state in which the mobile inner housing 100 has advanced sufficiently to force the face couplings 40 and 50 of the active and passive interface assemblies 12 and 14 respectively into contact. Seating of the active and passive face coupling flanges 40 and 50 respectively ensures final alignment of the two active and passive interface assemblies 12 and 14. Continued motion of the mobile inner housing 100 will start to compress the springs 146 in each of the radial latch compressible struts 82, while the alignment features of the active and passive side electrical connectors 250 and 260 respectively interact and engage. Compliant mounting of the connector plate on the active side allows the active assembly electrical connectors 118 to align to the passive assembly electrical connectors 72 independently of the alignment of face couplings on active and passive sides.

Figure 6D:
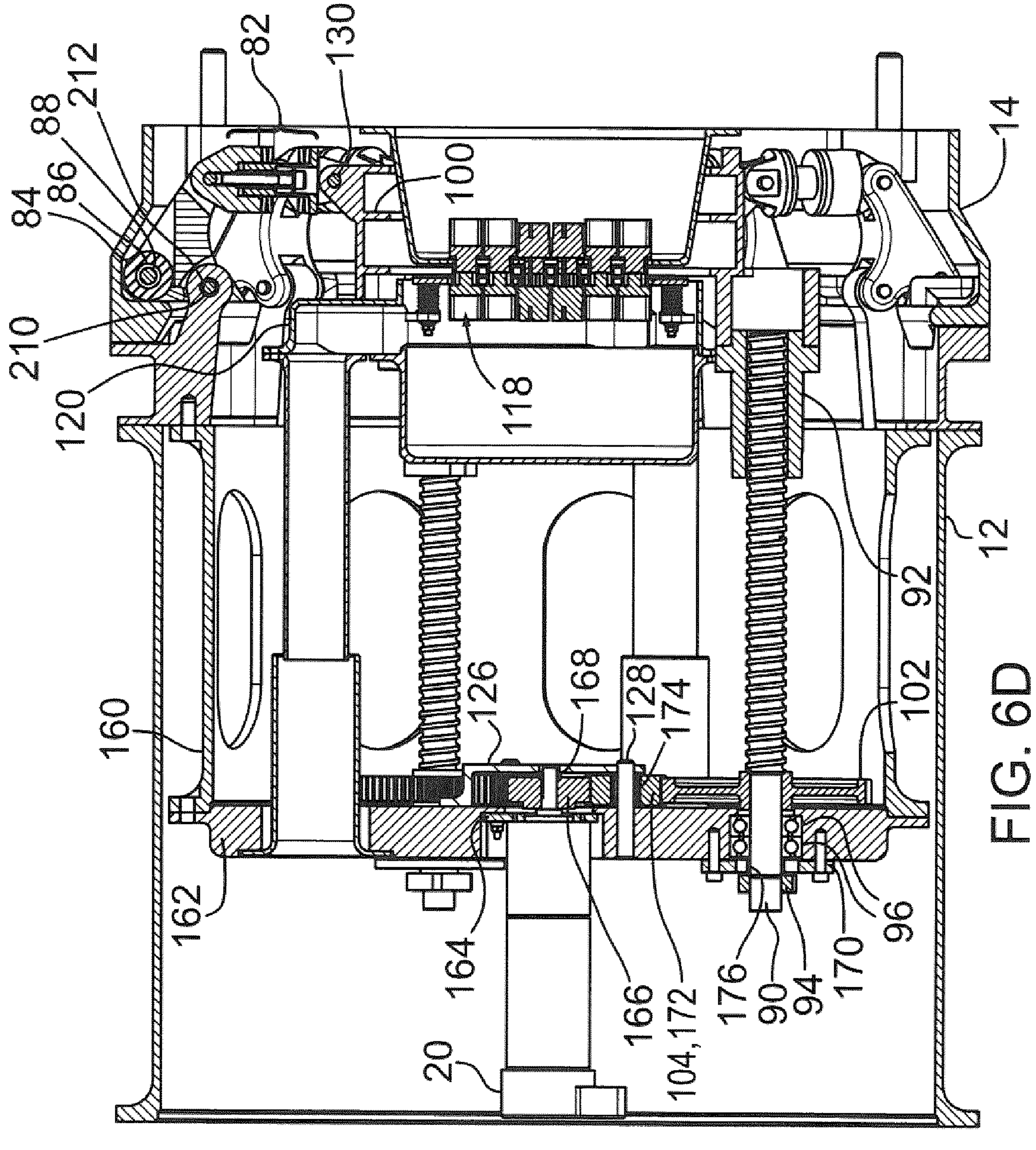

FIG. 6D shows the maximum interface load state. As the mobile inner housing 100 continues forward the springs 146 of the compressible struts 82 achieve their maximum compression when the pivots at both ends of all the compressible struts 82 become coplanar. The is the point of maximum preload at the interface, and the point of minimum effort to drive the mobile inner housing 100 forward due to the mechanical advantage afforded by the geometry. From this point forward the latches become self-locking and the interface cannot be forced open by external loads. Connector pins and sockets in the electrical connectors 72 and 118 in the passive and active interfaces begin to engage.

Figure 6E:
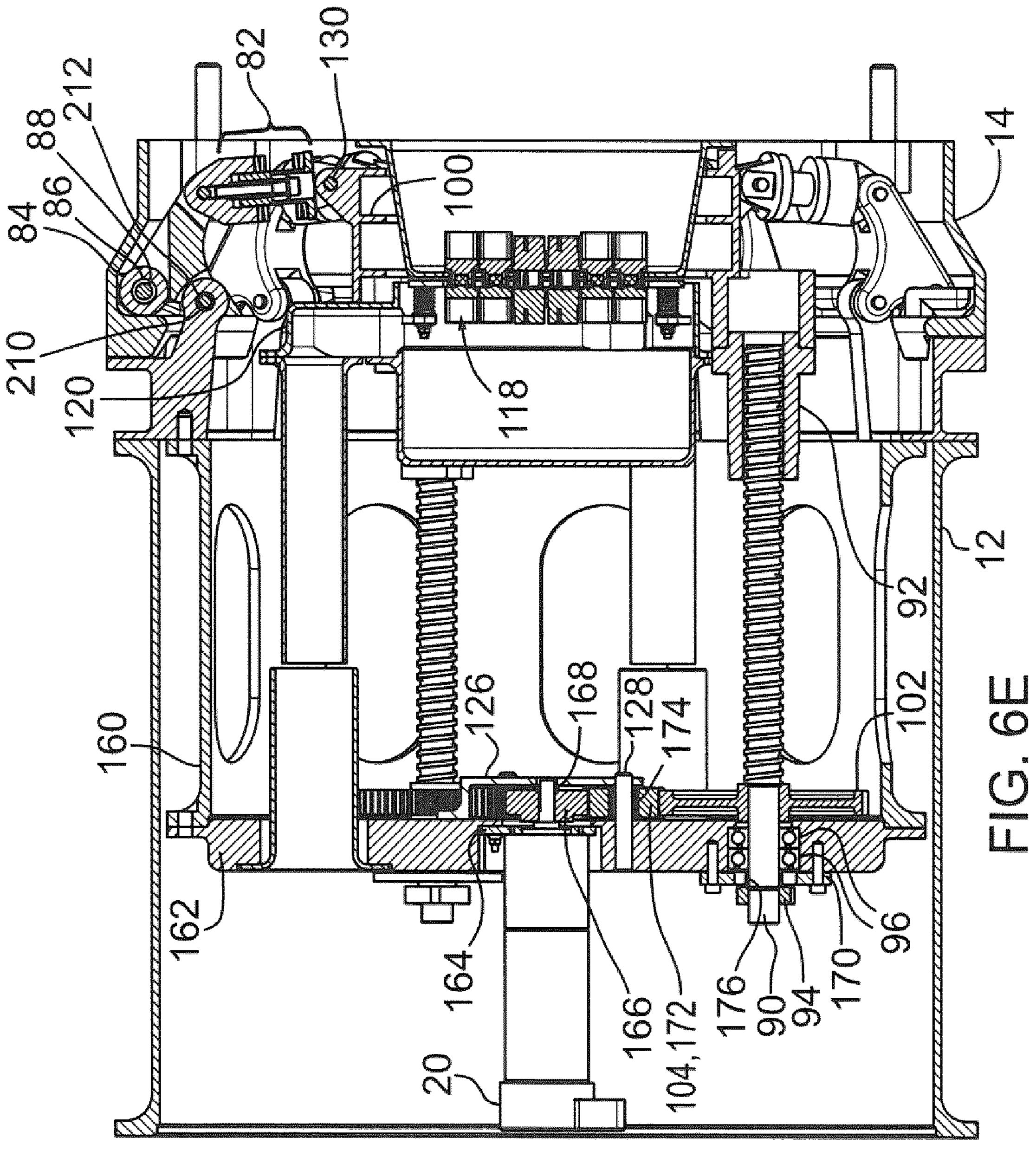

FIG. 6E shows the electrical connectors 72 and 118 in the mated state. The electrical connectors 72 and 118 become fully mated just before the end of the inner housing 100 stroke. As the mobile inner housing 100 continues forward the springs 146 of the compressible struts or links 82 are relaxing slightly.

Figure 6F:
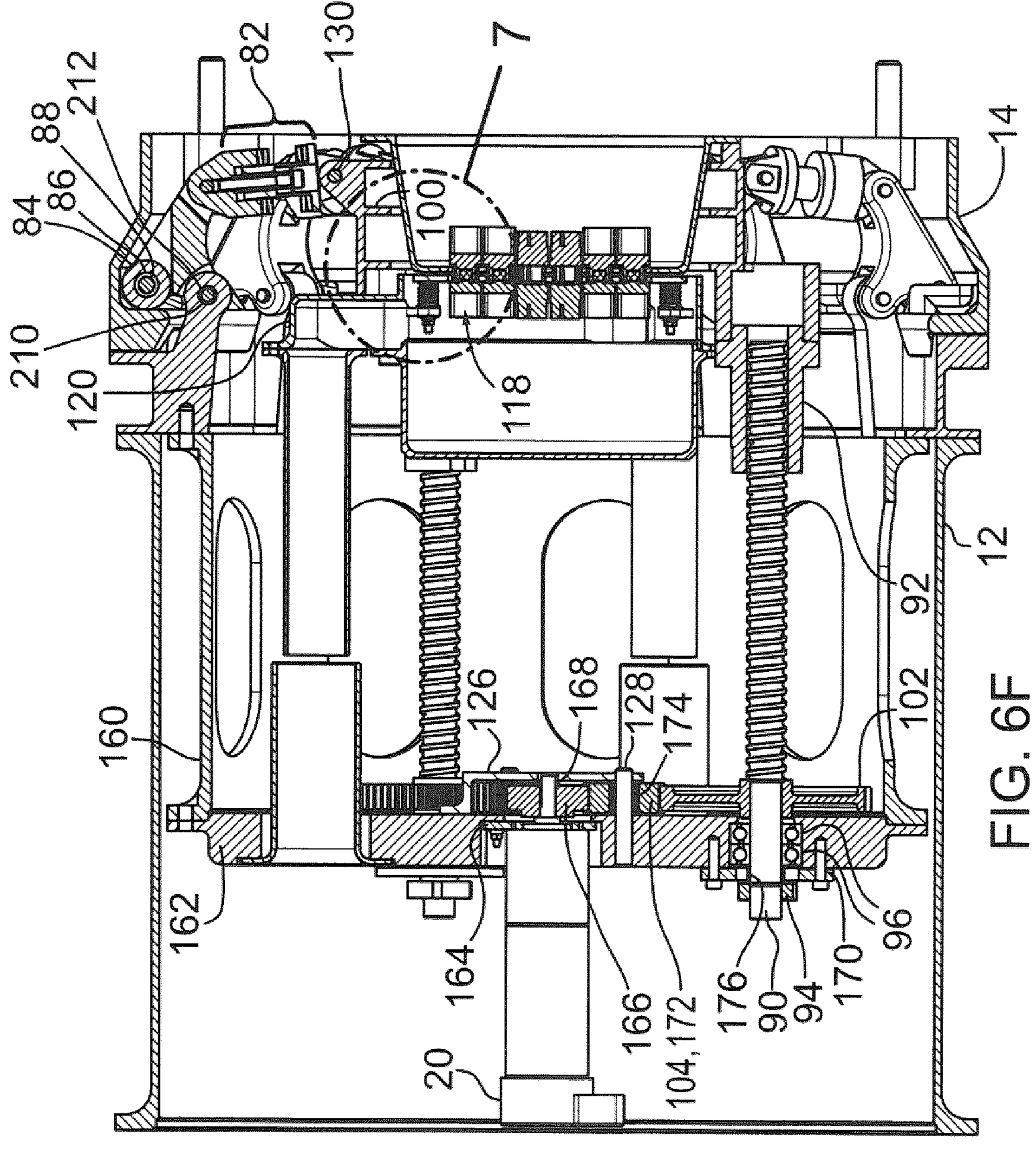

FIG. 6F shows the fully mated state of the active and passive interface assemblies 12 and 14 respectively. This state also represents the active and passive interface assemblies 12 and 14 in a self-locked state. The interface becomes fully mated at the end of the inner housing 100 stroke. At this point three (3) pads 124 on the front face of the mobile inner housing 100 come into contact with the surface to which the passive interface assembly 14 is mounted. These three points of contact become the reaction point for the radial latches after the actuator is de-energized. As such, the system does not require a brake. The springs 146 of the compressible links have relaxed to their final working length, establishing a fixed preload force applied by each latch. Motion between the connectors mated position or state of FIG. 6E and the fully mated position or state shown in FIG. 6F is accommodated by compression of springs within the compliant mounts of the connector plate.

Driving the mobile inner housing 100 in the reverse direction will open the interface using the same sequence of events but in reverse. This ensures the electrical connectors 72 and 118 are fully disengaged prior to releasing the interface.

The present system is advantageous for several reasons. First, actuation is via a single linear stroke which sequentially captures, aligns, seats and latches the interface, mating electrical connectors in the final few millimeters of stroke. Once rotary actuator 20 is actuated, significant capture envelope and self-alignment is achieved via multiple rotating latches. The interface preload is tuned through the appropriate selection of stiffness for spring 146 and evenly distributed around the interface perimeter in a short and direct load path. The present system embodies a rich design space that includes design variations for robotic base fixtures, tool fixtures and simple grasp fixtures as well as very large, externally driven, module to module interfaces.

Second, with the exception of the external radial latch embodiment (described hereinafter), linear actuation uses a novel concept for guidance that does not employ linear carriages or sliding bushings. Linear motion is achieved by ensuring the proximal end of the mobile inner housing 100 is maintained perpendicular to the axis of the end effector.

This orientation control, in conjunction with the coplanar arrangement of pivot pins 130 in the mobile inner housing 100 (to which the compressible struts 82 are attached), ensures that the inner housing axis 230 remains aligned with the end effector axis 240. Orientation control of mobile inner housing 100 is achieved by driving said housing with multiple ball screws 90 driven from a central rotary actuator 20. Avoiding the use of linear tracks and carriages results in a design that is simple, light weight, with low part count and with comparatively low requirements for precision.

Third the actuation load is highest shortly after the onset of strut compression, thus occurring well before final latching of the interface. Thereafter actuation load ramps down as struts approach the "on-center" condition. Once past center, the actuation load approaches zero or may actually go negative before the engagement of connectors. This ensures the actuation torque required to release the interface is comparatively low compared to the peak actuation torque. Low release torque is also desirable for implementation of an external EVA drive.

Fourth, at end of stroke the latches are in a self-locking state (externally applied loads cannot force the latch open).

Fifth, the present system is scalable in several parameters. More particularly, with respect to radius, the radius of contact is the fundamental variable for moment capacity. The radii of inner pivots and outer pivots can be scaled together or individually. Scaling these three radii selectively allows for a tradeoff between interface capacity vs. capture envelope vs. volume for connectors.

With respect to the number of latches, the quantity of latches can be altered with three (3) being the minimum quantity. The spaces between latches can accommodate other devices such as proximity sensors, force/moment sensors, cameras and lights where it is desired not to have these elements mounted on the exterior of the active interface assembly 12. This is particularly advantageous when considering a smaller sized interface for a dexterous robot. For example, at a load radius of 75 mm (i.e. 150 mm diameter "tool" interface), a 3 latch design could react 250 Nm overturning moment while allowing for three inter-latch volumes sufficient to package force/moment sensing or proximity sensing devices. Larger, robotic arm base interfaces (as shown in the current embodiment) require more latches to achieve both the high preload required (as the preload of the interface is the sum of the individual contributions of each latch), and the uniform distribution of load so desirable in such an application.

With respect to electrical connector capacity, the number and arrangement of electrical contacts can be adjusted depending on end use, or in the extreme case of a grasp-only interface the central space for connectors can be reduced to zero. In addition, a higher packing efficiency can be achieved by replacing OTS connectors with a custom arrangement of contact pins.

Sixth, with respect to interface preload, the selection, arrangement and installation preload of springs 146 can be adjusted to tune interface preload, thus allowing greater flexibility in the selection of the other, aforementioned scalable parameters.

In a first embodiment there is provided an interface coupling system for releasably securing a selected object to a spacecraft and securing various payloads to the selected object and to each other. The coupling system is comprised of an active interface assembly and a passive interface assembly. The active interface assembly includes 1) a flat coupling located at its proximal end for structurally attaching it to the robotic arm, 2) electrical connections for electrically connecting it to the robotic arm, 3) a stepped interface coupling located at its distal end 4) three or more latches arranged in radial planes (radial latches), 5) each latch including a compressible strut sized to produce a predictable preload at the interface, 6) with each latch having a coupling to an inner housing that is driven forward (towards the passive side) in a single continuous motion to achieve capture, alignment, seating, electrical connection and latching of the interface, and 7) electrical connectors and/or contacts sufficient to support the needs of the robotic arm and the needs of future payloads. The passive interface assembly includes 1) a first coupling located at its proximal end complementary to the second coupling on the active interface assembly for structurally attaching the passive interface assembly to said second coupling by clamping the rim of said first coupling to said second coupling with said radial latches, 2) a second coupling located at its distal end for affixing the passive interface assembly to a desired object, 3) alignment guides complementary to said radial latches, and 4) electrical connectors and/or contacts sufficient to support the needs of the specific instance of the passive interface, be it a robotic arm base or payload handling point.

In an alternative embodiment an external radial latch interface system is provided in which, the active interface assembly comprises an active interface housing, a mobile outer housing, three (3) or more latches external to the active interface housing consisting of a rocker arm, a compressible link and a latch roller arranged in radial planes with two pivoting connections to the active interface housing, a linkage driven by the mobile outer housing, and an actuator and mechanism to drive the translating motion. In this external radial latch interface system the passive interface assembly includes an outward facing coupling flange corresponding to the external arrangement of radial latches.

Figure 10:
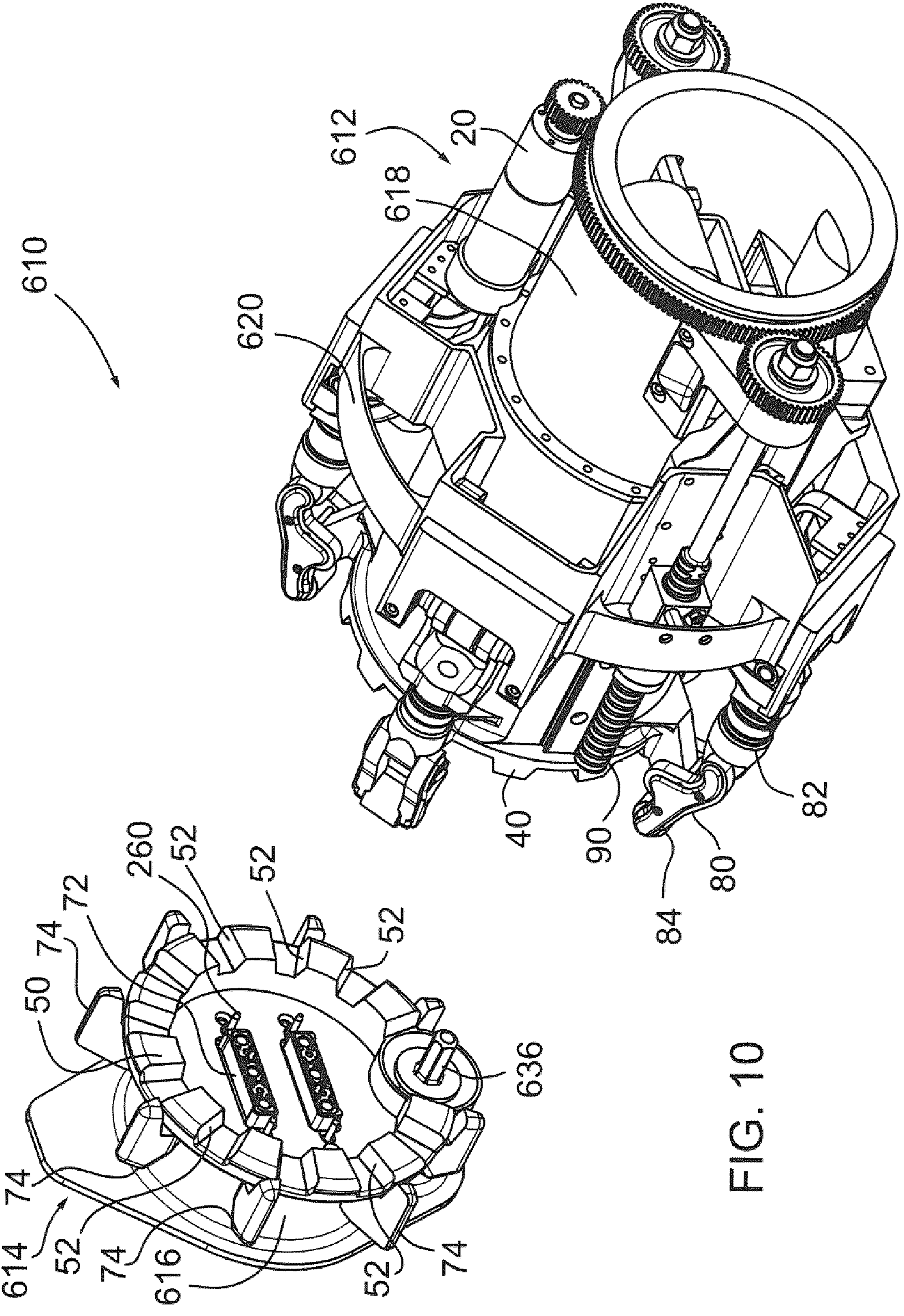
FIGS. 10, 11 and 12 are perspective views depicting a second, external embodiment of the radial latch interface system, with FIGS. 13A through 13F showing the external embodiment in key mechanism states.
Figure 11:
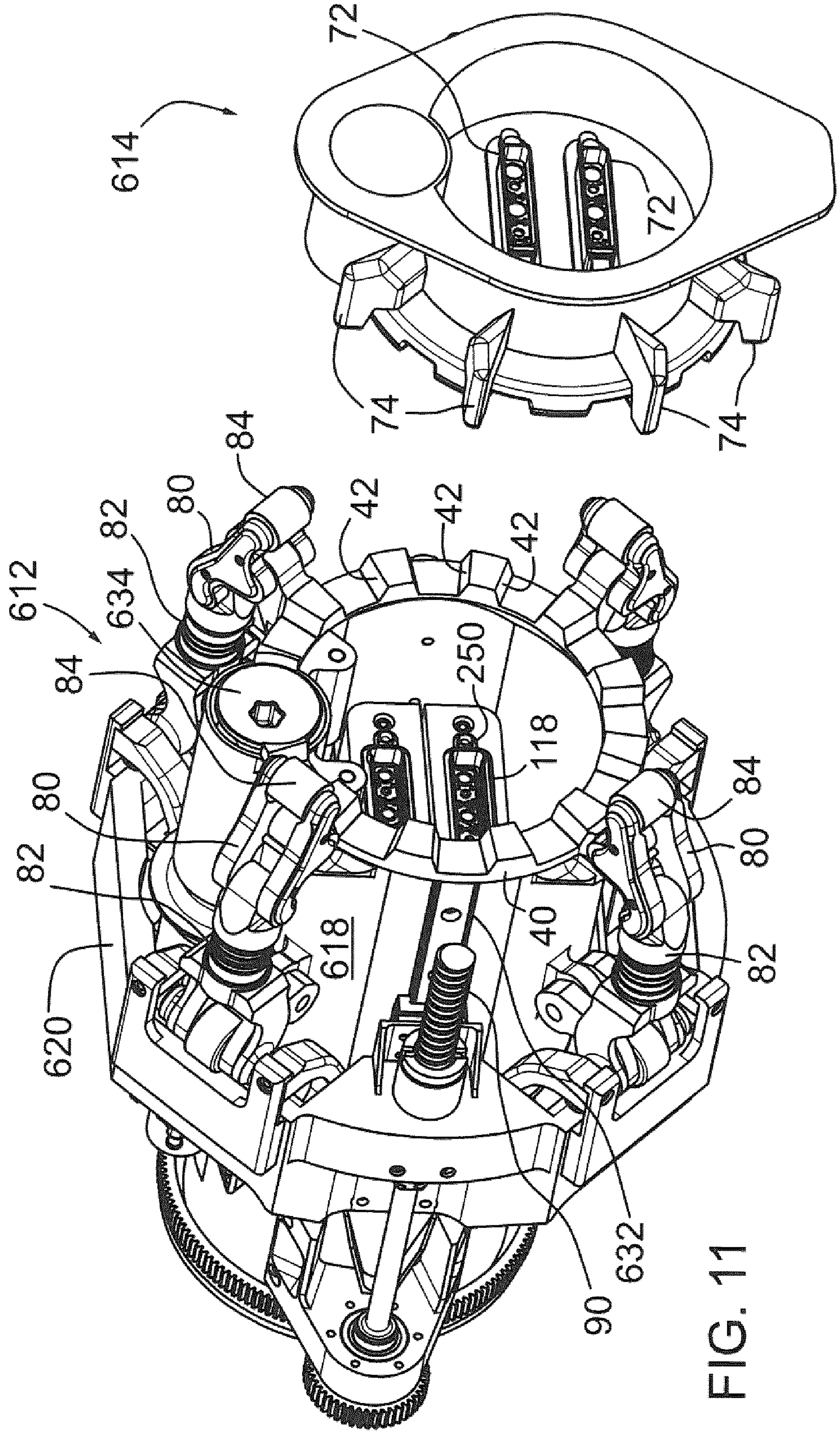

Said external radial latch embodiment, shown in FIGS. 10 and 11, is ideally suited to smaller, dexterous robotic systems where moment capacity at the interface is typically 300 Nm or less. This capacity is readily achievable by applying compressible struts of similar capacity and size as those of the first embodiment in said external arrangement of radial latches using a latch radius of approximately 75 mm. Said external arrangement of radial latches renders the central volume of said fixed inner housing available for the central umbilical connectors.

This external radial latch embodiment differs from the first embodiment in requiring a drive linkage incorporating track rollers and ramps to force each radial latch to close when the translating outer housing is moved in the forward direction and to open when moved in the rearward direction. This in turn requires the use of precision linear guides to control the motion of said translating outer housing with respect to said fixed inner housing.

Notwithstanding these differences, the core concept remains the same, wherein a single actuation of three (3) or more latches 81 arranged in radial planes sequentially captures, aligns, seats and latches the interface while mating electrical connectors in the final portion of mechanism stroke.

FIGS. 10 and 11 depict an external embodiment of the radial latch interface system 610. The active interface assembly 612 comprises a fixed inner housing 618, a mobile outer housing 620, active side electrical connectors 118 with connector alignment features 250, 4 external latches consisting of a rocker arm 80, a compressible link 82 and latch roller 84, arranged in radial planes with two pivoting connections to the active interface housing, and an actuator 20 and mechanism to drive the translating motion via ballscrews 90. The passive interface assembly 614 comprises a passive interface housing 616, passive side electrical connectors 72 with connector alignment features 260, and alignment guides 74. The active and passive interface assemblies interface via coupling contact surfaces 42 and 52 on active and passive face coupling flanges 40 and 50 respectively. Also evident in FIGS. 10 and 11 are bolt driver 634 and passive interface drive bolt 636 which are typical accessories of a dexterous robot interface, depicted here only to demonstrate feasibility.

Figure 12:
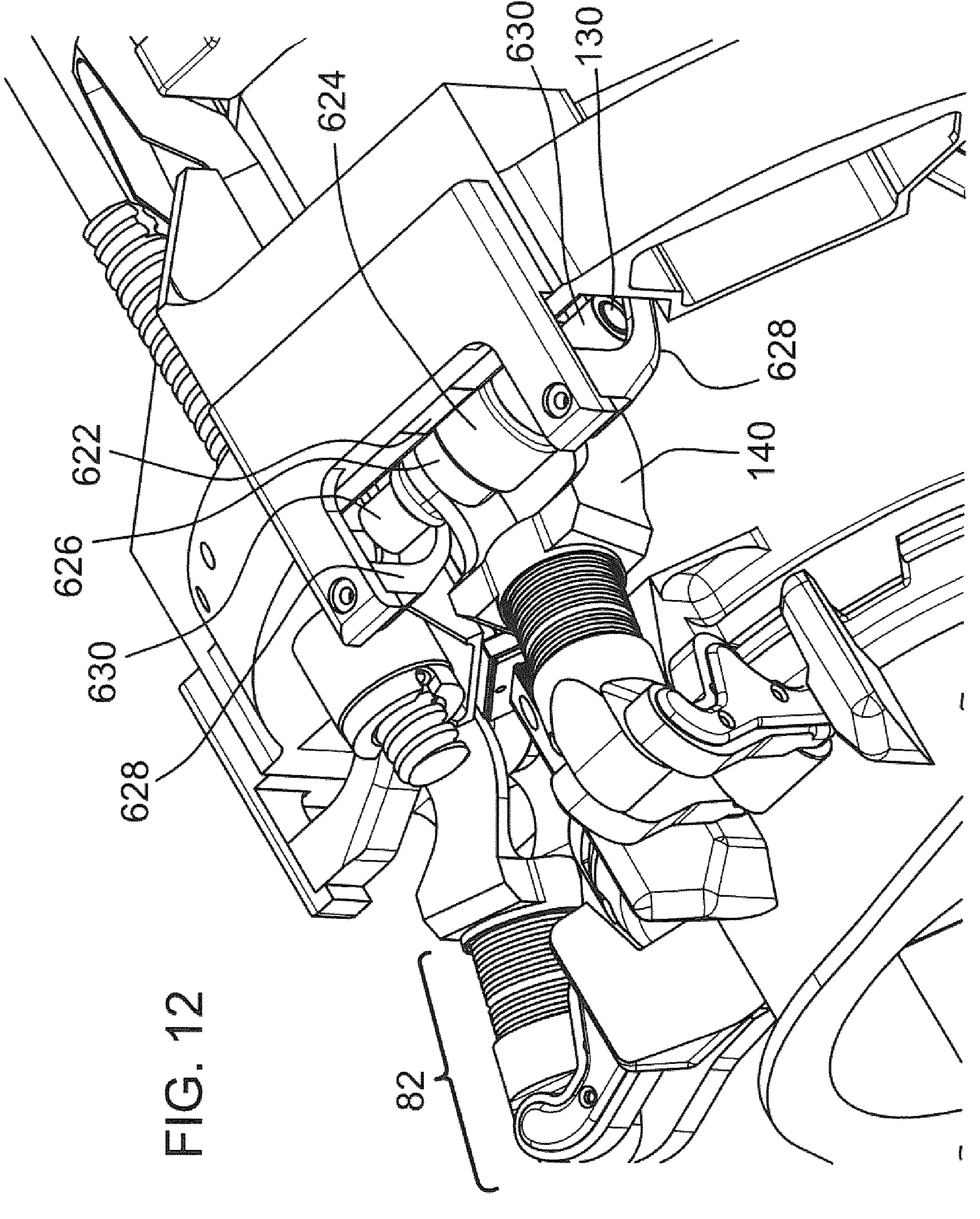

FIG. 12 depicts the arrangement of track rollers and ramps required to actuate the external arrangement of latches. For each latch, link pivot pin 130 forms a common centre for drive roller 624, drive link 626, compressible strut clevis 140 and kick rollers 630 Drive roller 624 is guided by drive ramp 622 for the portion of mechanism stroke from fully retracted until the on-centre condition while kick rollers guided by kick ramps control the position of link pivot pin 130 for the portion of stroke from the on-centre condition until the fully mated condition. This arrangement of rollers and ramps allows the mating of electrical connectors to be completely separate from the mechanical latching of the interface.

FIGS. 13A through 13F depict the mechanism at key positions. The drive linkage by which the mobile outer housing 620 actuates the radial latches 81 is based on the pivoting connection of drive link 626 to active interface housing 618 and the interaction of rollers and ramps depicted in FIG. 12.

Figure 13A:
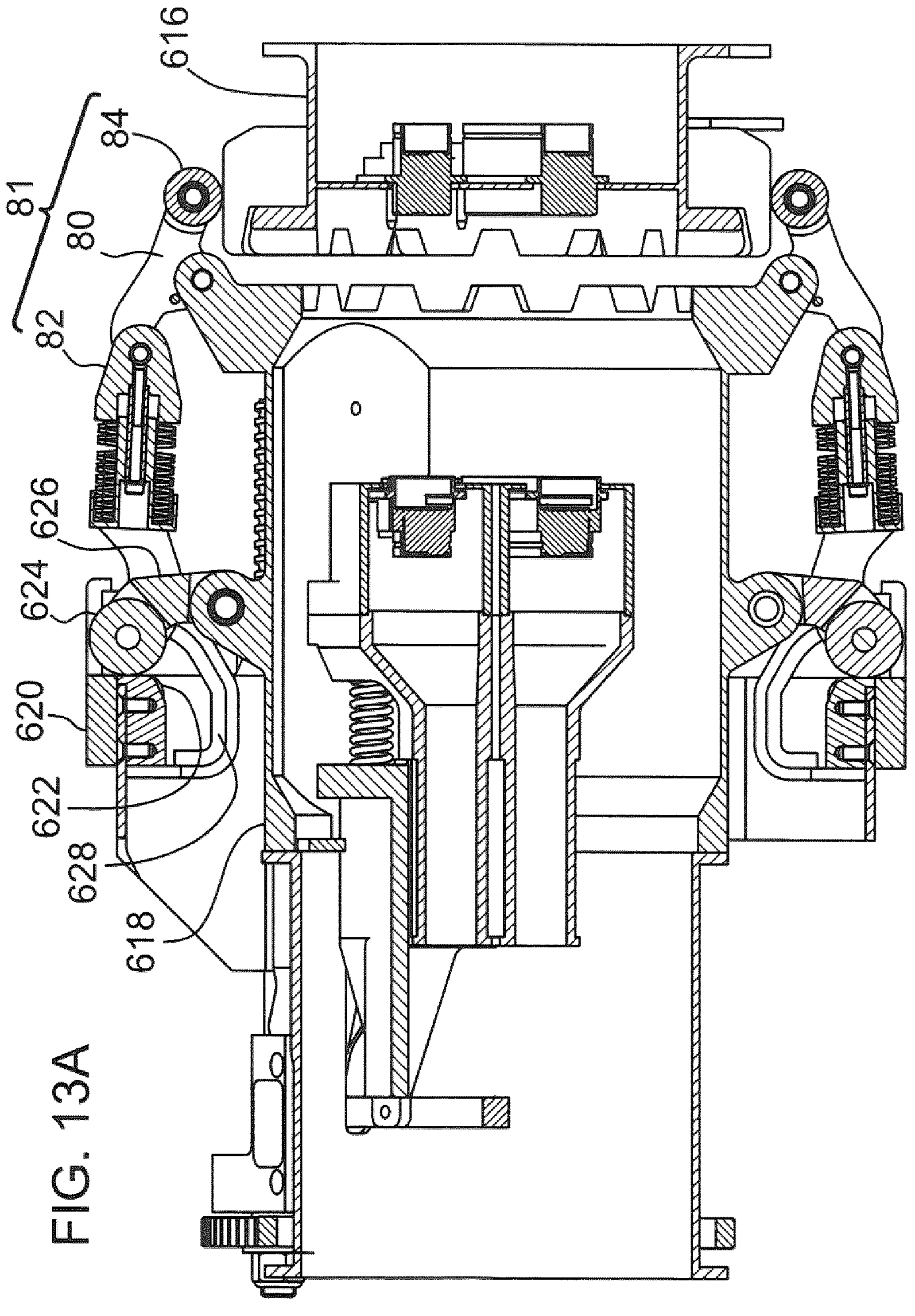
Figure 13B:
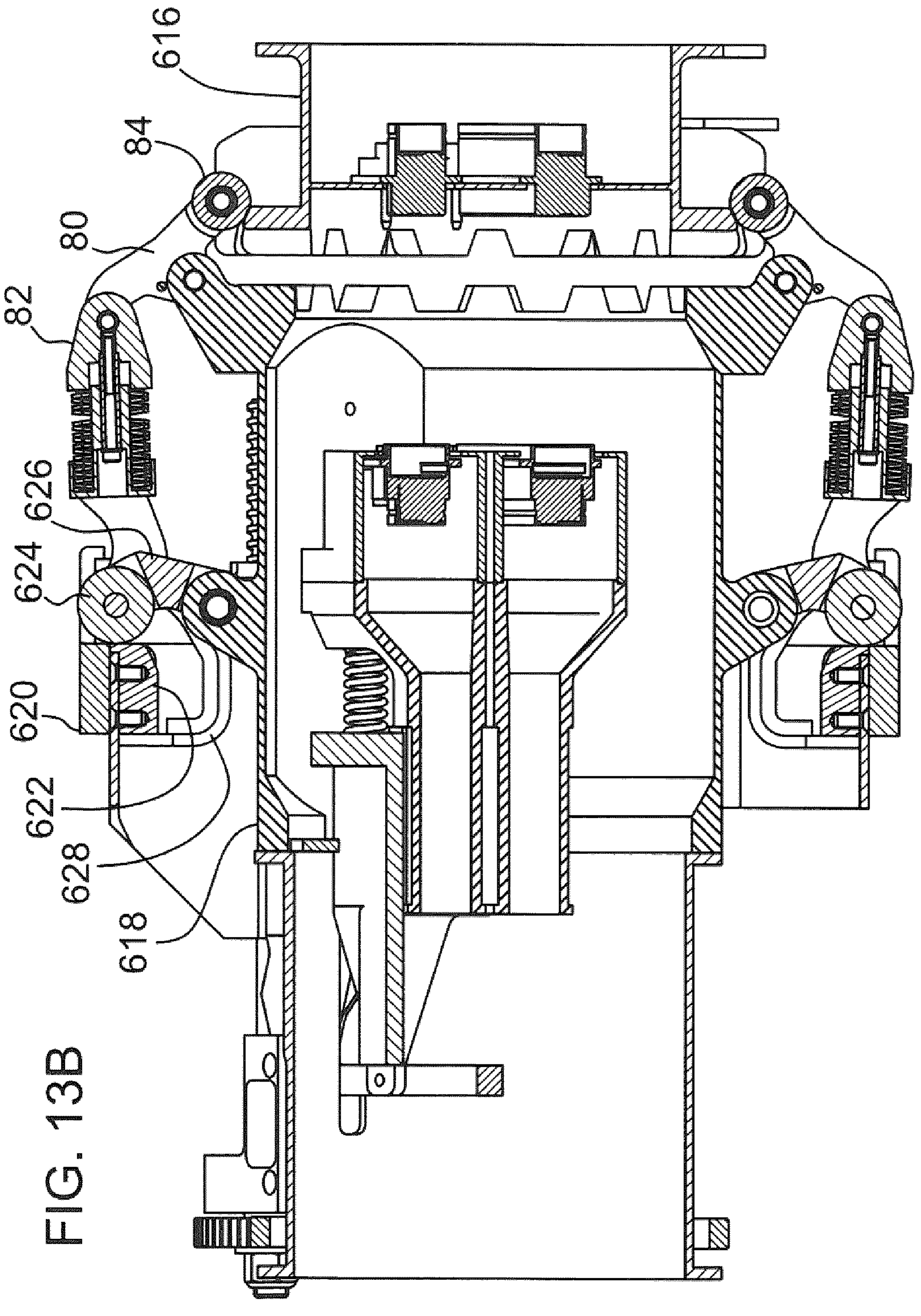
Figure 13C:
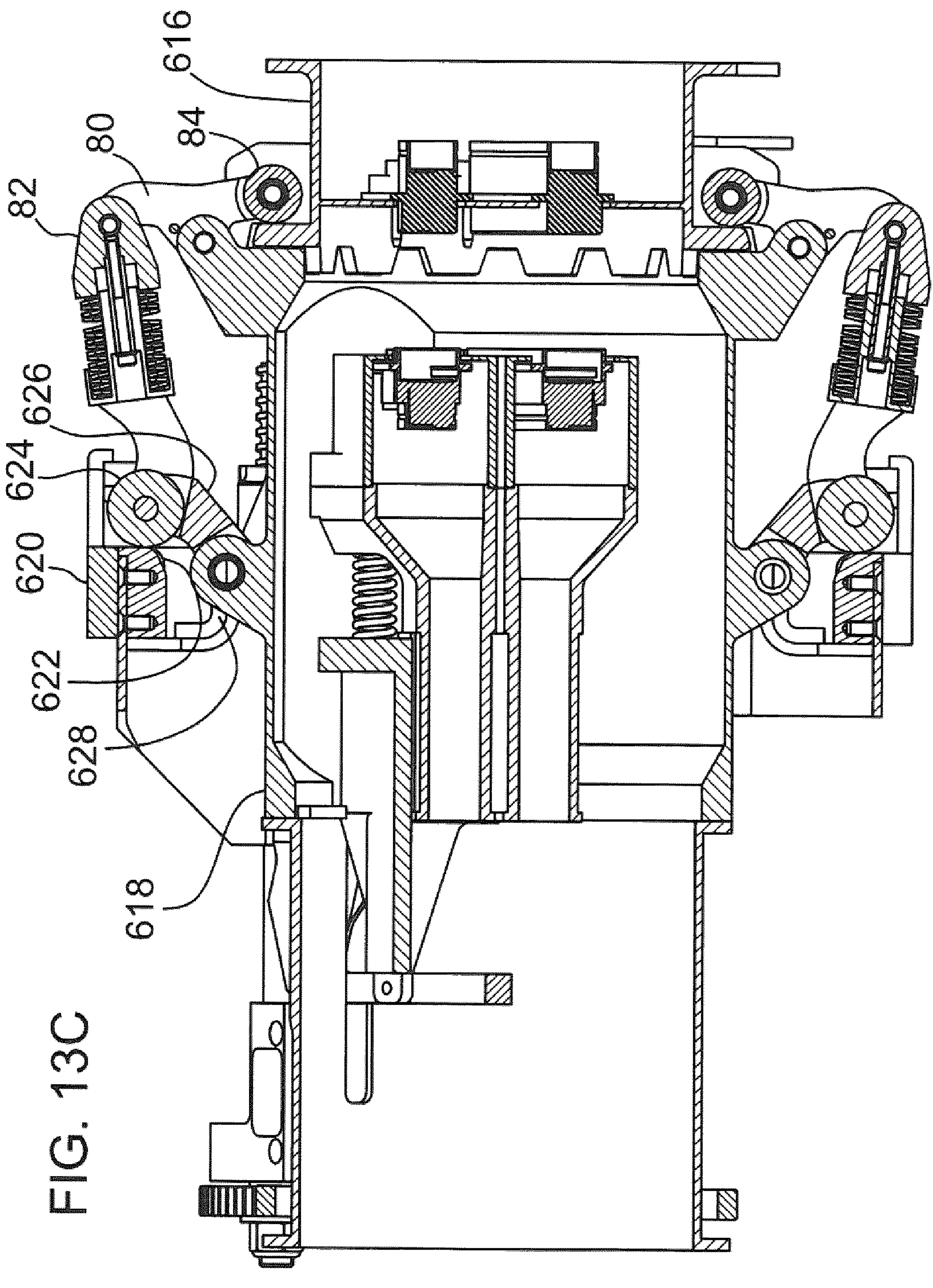
Figure 13D:
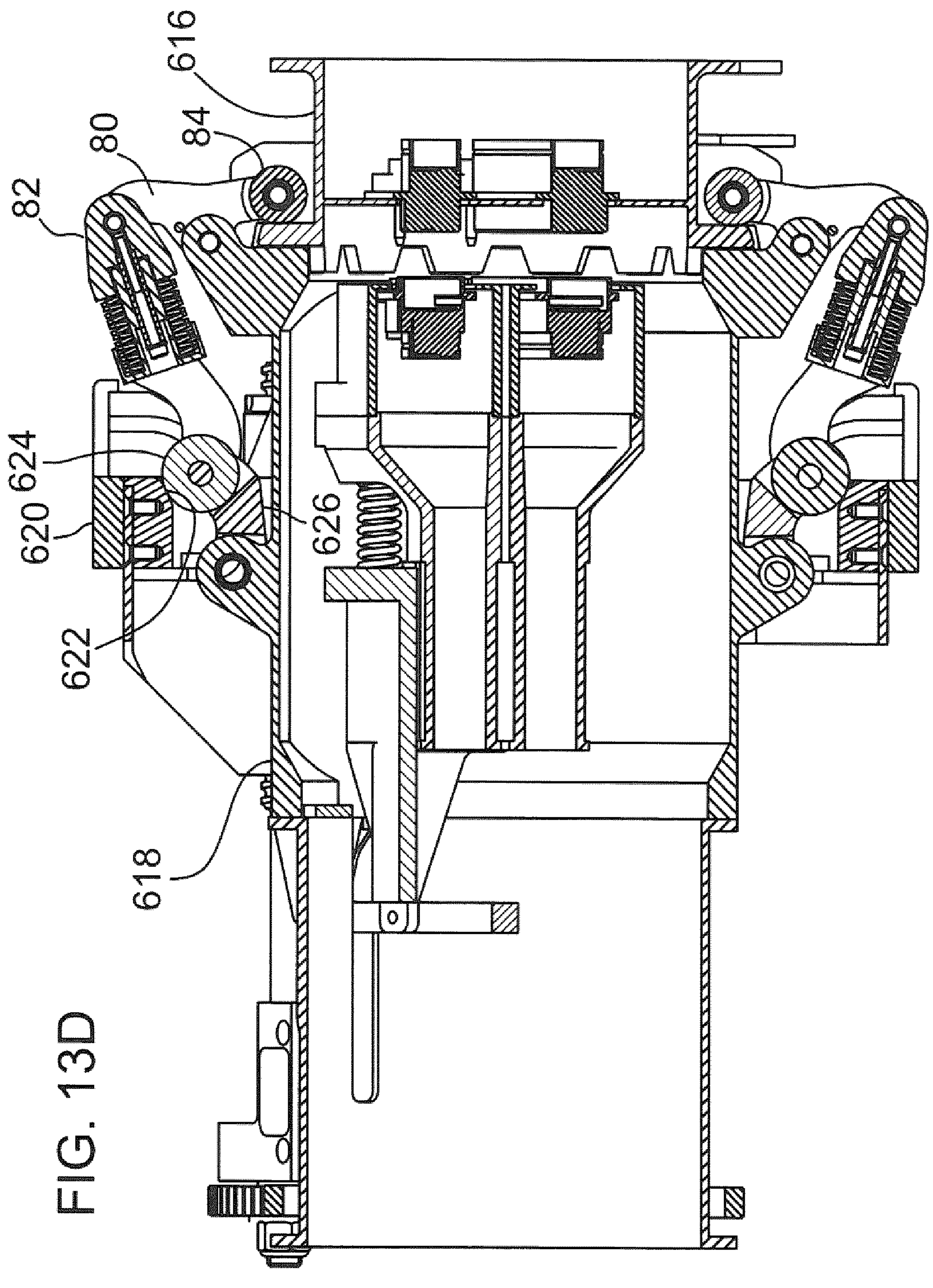
Figure 13E:
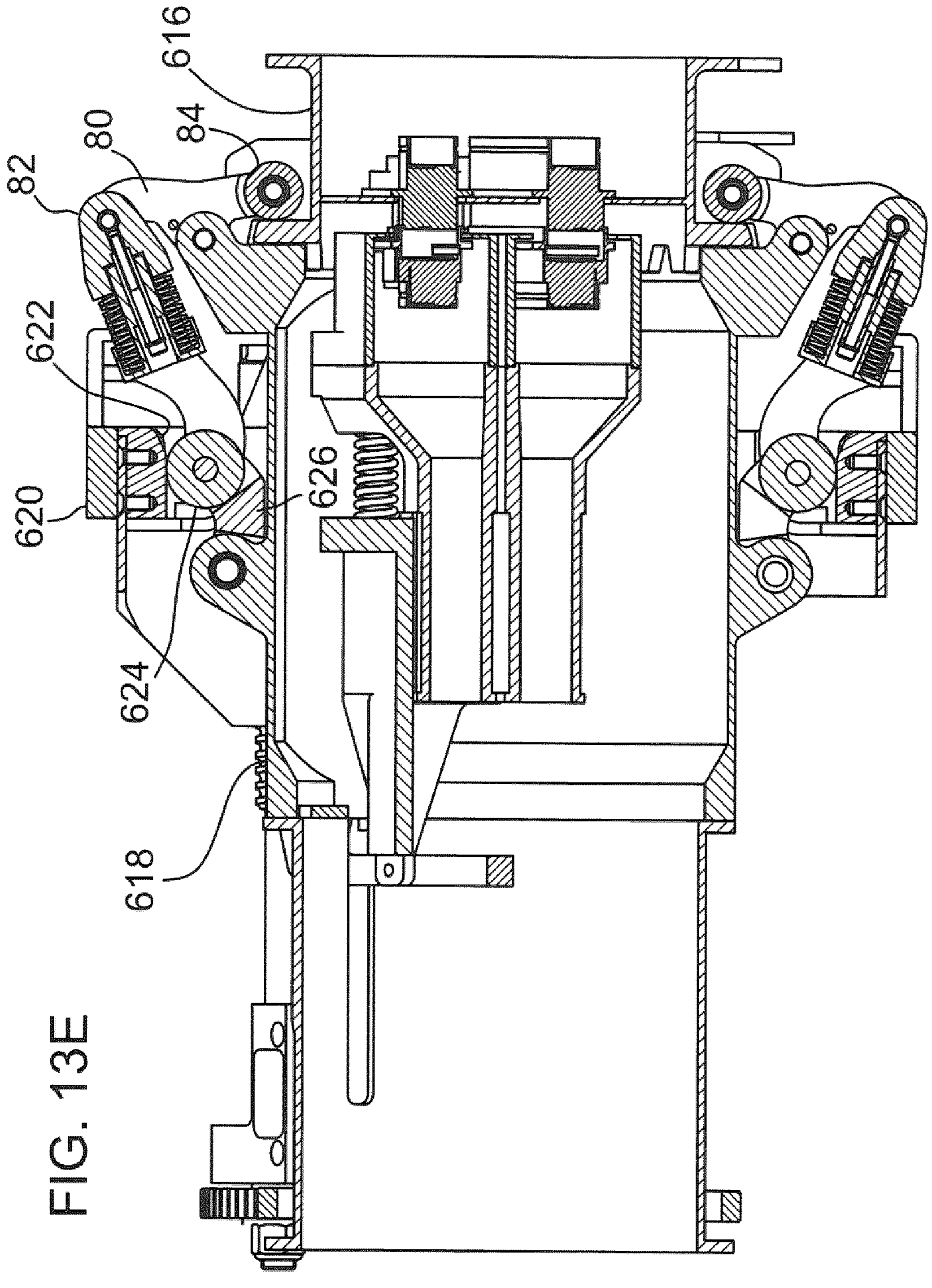
Figure 13F:
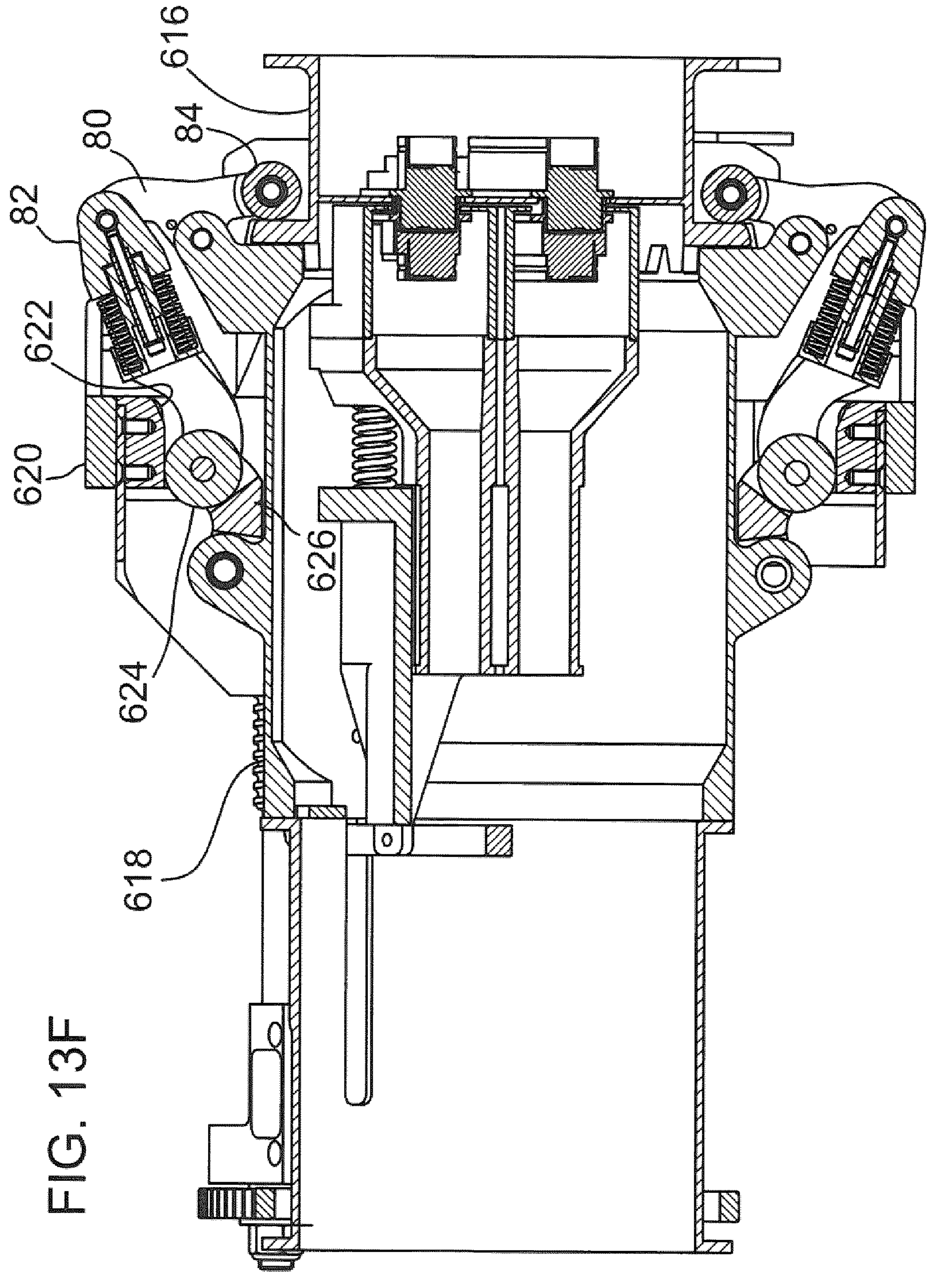

FIG. 13A shows the ready to latch state where the mechanism is fully retracted, the latches fully open and where significant misalignments between the active and passive interface assemblies may be present. As the mechanism progresses through its stroke one or more latches will make contact on or under the rim of the passive face coupling flange 50 as shown in FIG. 13B. Continued actuation closes the interface while the interaction of rocker arms 80 and contact rollers 84 with alignment guides 74 guide the active and passive interfaces into alignment and finally to a seated position as in FIG. 13C. Further actuation compresses the springs 146 in each compressible strut 82. The point of maximum load is shown in FIG. 13D, also described as the on-centre condition. Actuation beyond this point causes a small gap to form between drive roller 624 and drive ramp 622 while kick rollers 630 come into contact with kick ramps 628. Slight relaxation of springs 146 within each compressible strut 82 has occurred between the on-centre position in FIG. 13D and the over-centre condition of FIG. 13E, however continued actuation no longer affects radial latches as kick rollers 630 and kick ramps 628 are configured to hold the latch position stationary while the translating outer housing 620 continues to drive active side electrical connectors 118 towards engagement with passive side electrical connectors 72. FIG. 13E shows the connectors beginning to engage while FIG. 13F shows the fully mated condition.

In a third embodiment an externally actuated radial latch interface system is provided in which the actuator is replaced with an external drive shaft in the form of a hexagonal bolt head, such as might be actuated by a dexterous robot equipped with a bolt driver. This third embodiment uses internal radial latches similar to the first embodiment and is further modified to sacrifice capture envelope in order to minimize mechanism stroke and overall length. This configuration is suited to function as a separation plane mechanism, such as might be employed to disconnect a portion of the robotic arm from itself to facilitate repair or upgrade. This is particularly useful in a scenario where there are two robotic arms and they are also required to service each other. An externally driven embodiment of the radial latch interface system 710 inserted between the end of a boom and the cluster of joints to which it is connected would facilitate either servicing of, or complete replacement of, the joint cluster with end effector. Similarly, additional placements either side of an elbow joint would facilitate the complete disassembly of the robotic arm into booms and joint assemblies.

Figure 14:
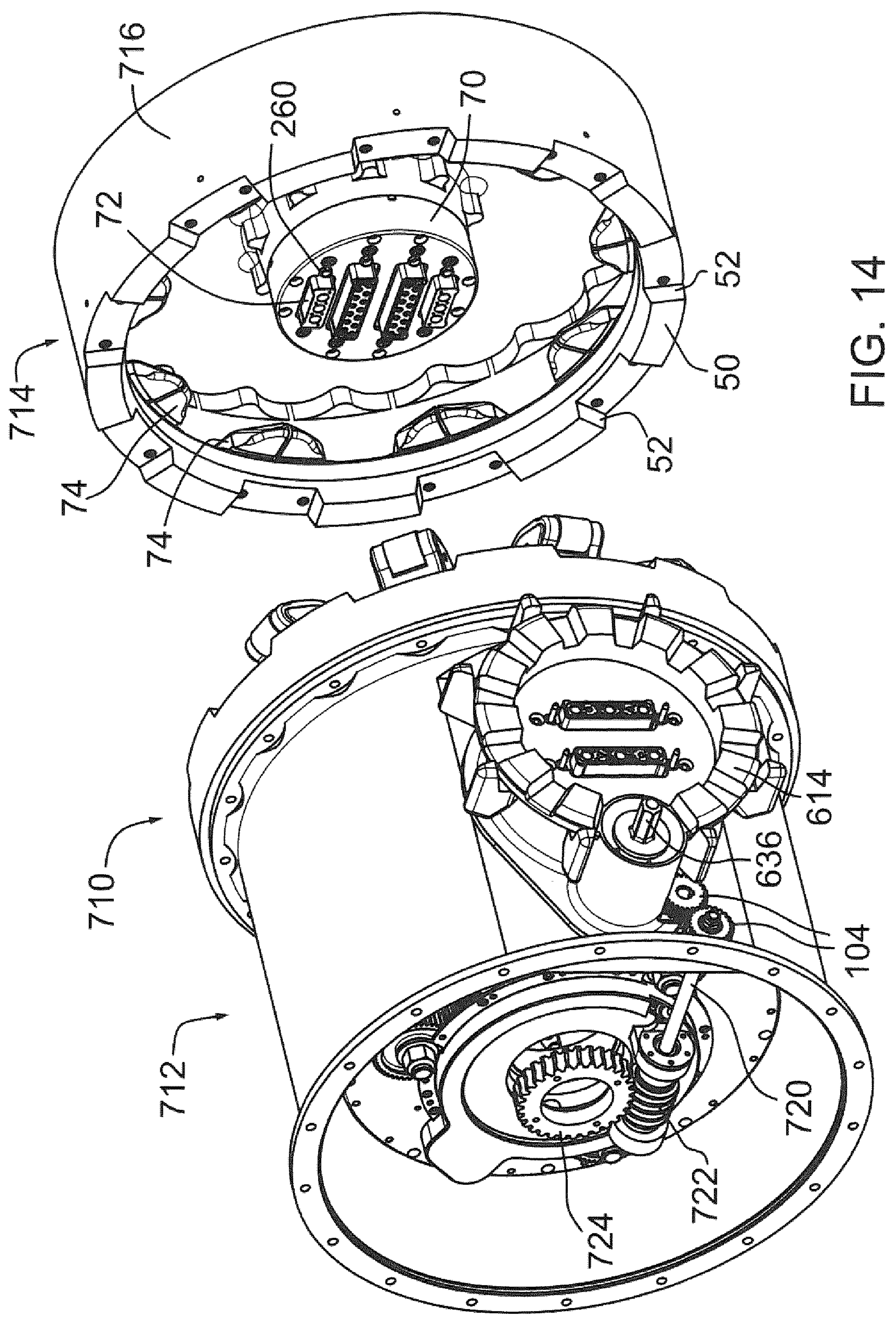
FIGS. 14 and 15 depict a third, externally driven embodiment of the radial latch interface system.
Figure 15:
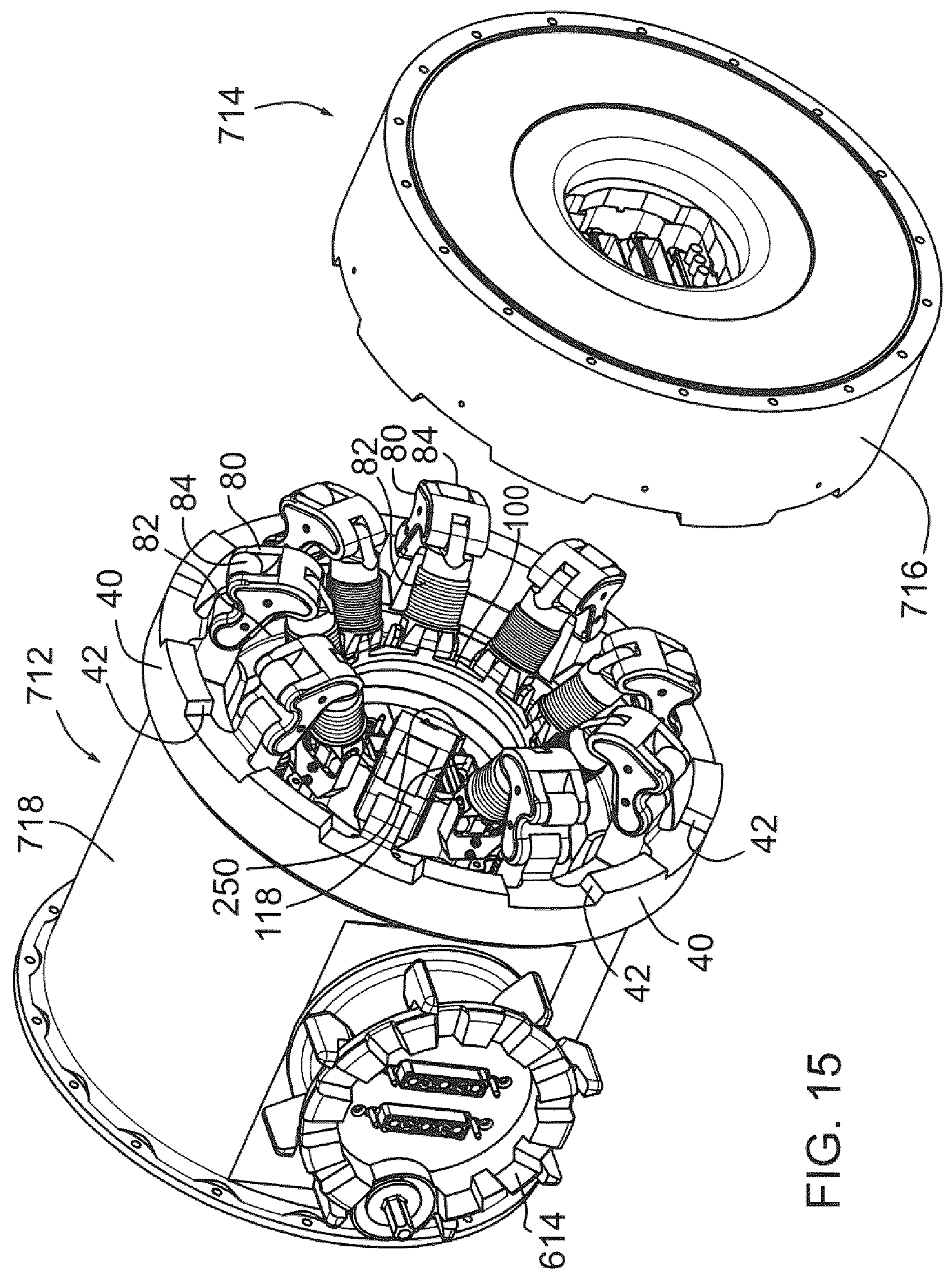

FIGS. 14 and 15 depict an externally driven embodiment of the radial latch interface system 710. The active interface assembly 712 comprises a fixed outer housing 718, a translating mobile inner housing 100, active side electrical connectors 118 with connector alignment features 250, and 9 internal latches consisting of a rocker arm 80, a compressible link 82 and latch roller 84, arranged in radial planes with pivoting connection to both the fixed outer housing and translating inner housing. An external embodiment of the passive interface assembly 614 is mounted on the outside of the fixed outer housing 718 with its axis normal to the axis of the active interface assembly 712. A passive interface drive bolt 636 is used to transfer rotary motion from an external source, such as a dexterous robot bolt driver, via idler gears 104 to a driveshaft 720 which drives a worm 722 and wheel 724. Rotary motion is further distributed to ballscrews 90 via drive gears 102.

The passive interface assembly 714 comprises a passive interface housing 716, passive side electrical connectors 72 with connector alignment features 260, and alignment guides 74. The active and passive interface assemblies interface via coupling contact surfaces 42 and 52 on the active and passive face coupling flanges 40 and 50 respectively.

Figure 16A:
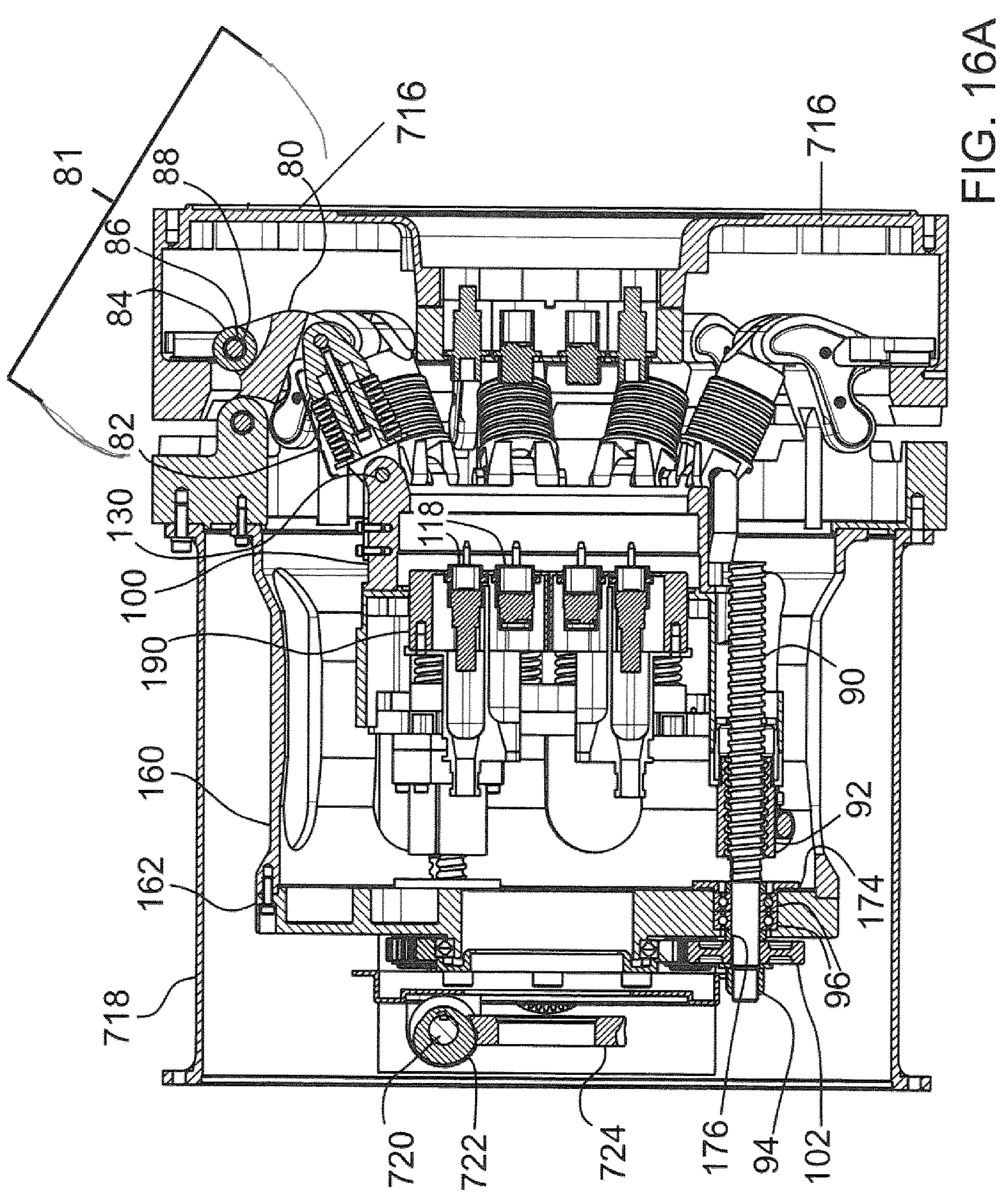
FIGS. 16A and 16B showing said externally driven embodiment in the ready to latch and fully mated conditions respectively.

FIG. 16A shows the ready to latch state where the mechanism is fully retracted and the latches are fully open. Geometry of the rocker arms 80 has been altered from the first embodiment in order to minimize mechanism stroke. The capture envelope of the active assembly 12 is correspondingly reduced, however the insertion of the active interface assembly 712 into the passive interface assembly 714 is performed by the dexterous robot on a known trajectory, as compared to the scenario for the first embodiment wherein more significant offsets can result from the approach controlled by visual servoing. In this case, a generous lead-in surface on the passive interface coupling 50 for latch rollers 84 will be adequate to facilitate insertion.

Figure 16B:
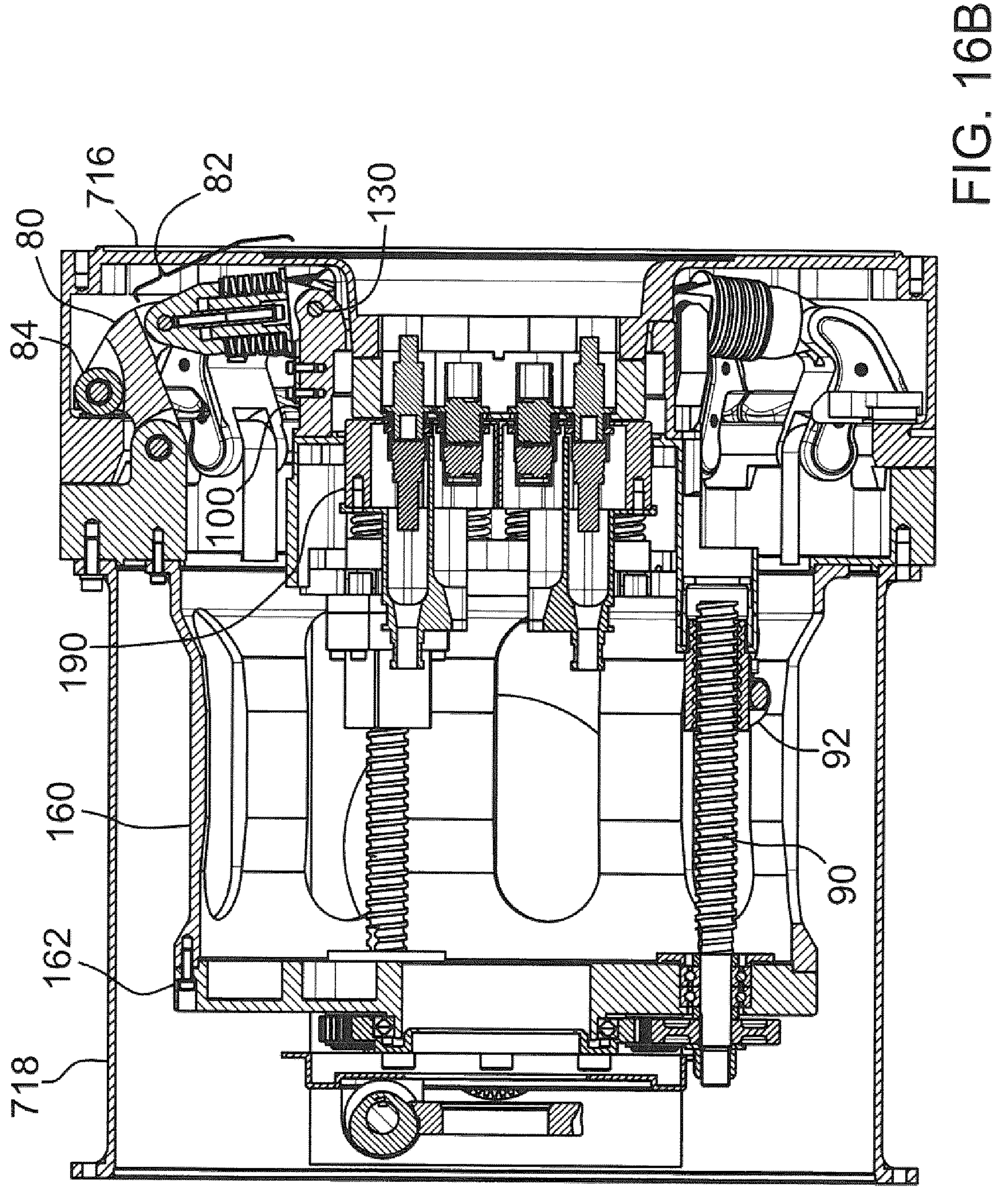

FIG. 16B shows the fully mated condition where the mobile inner housing 100 has travelled sufficiently to fully engage active side and passive side electrical connectors 118 and 72 respectively, and to drive the compressible strut 82 to an over-center condition. The mechanism is self-locking in this condition, the external tool drive can be removed and the interface will remain closed despite any amount of externally applied load.

In the above mentioned embodiments further comprising a sensor system mounted on one or both of the active and passive interface assemblies for enabling remote operator control of all activities associated with aligning and latching the active and passive interface assemblies together based on feedback from the sensor system. This sensor system comprises any one or combination of a camera based vision system, proximity sensors, radar and LIDAR.

Therefore what is claimed is:

1. A radial latch interface mechanism for releasably coupling one end of a robotic arm, or any other selected first object, with a second object, comprising:

a) a passive interface assembly including a passive interface housing having a distal end to which said second object is structurally attachable and a proximal end having a passive face coupling interface flange with the passive interface housing including a preselected number of radial latch alignment guides peripherally arranged around an inside surface of the passive interface housing;

b) an active interface assembly including a fixed outer active interface housing having a longitudinal axis and a proximal end to which said robotic arm, or said any other selected first object, is structurally attachable and a distal end including an active face coupling interface flange configured to mate with said passive face coupling interface flange;

a mobile inner housing having a mobile housing axis collinear with said longitudinal axis, said mobile inner housing being movably attached to said fixed outer active interface housing by at least three radial latches radially mounted about said longitudinal axis such that the motion of said mobile inner housing with respect to said fixed outer active interface housing is restricted to translation along said longitudinal axis, said preselected number of radial latch alignment guides being equal to the number of said at least three radial latches and each radial latch alignment guide having two spaced rigid members with the rigid members having a gap between them sized to receive a corresponding radial latch;

a single rotary drive mechanism operably connected to said mobile inner housing configured to translate said mobile housing along said longitudinal axis in a first direction and a second direction, said second direction being opposite to said first direction;

c) wherein upon coarse alignment by the robotic arm, or the any other selected first object, of the active interface assembly with said passive interface assembly to within a capture envelope of the said active interface assembly and upon activating said single drive mechanism said mobile inner housing translates in said first direction in a continuous motion toward said passive interface assembly, each of said at least three radial latches being received in a corresponding radial latch alignment guide of said preselected number of radial latch alignment guides to guide the active and passive interfaces into alignment and finally to a seated position to latch the active interface assembly to the passive interface assembly to sequentially achieve capture, alignment, seating and secure self-locked attachment of said passive face coupling interface flange against said active face coupling interface flange; and upon activating said drive mechanism such that said mobile inner housing translates in said second direction away from said passive interface assembly, said at least three radial latches unlatch and retract from said passive face coupling interface flange such that said passive face coupling interface flange is not secured to said active face coupling interface flange.

2. The radial latch interface mechanism according to claim 1, wherein each of said at least three radial latches includes a rocker arm, a compressible strut, a latch roller, bushing and latch roller pin, said rocker arm being pivotally mounted to the distal end of said fixed outer active interface housing, said compressible strut having two ends connected longitudinally by an elastic material such that said compressible strut longitudinally compresses when a compressive force is applied to said two ends, and wherein one of said two ends is pivotally mounted to the distal end of said mobile inner housing and the other of said two ends is pivotally mounted to said rocker arm, and wherein each of said at least three radial latches has a rotational plane which is parallel to said longitudinal axis and the motion of said rocker arm and compressible strut is restricted to rotation in said rotational plane.

3. The radial latch interface mechanism according to claim 2, wherein upon securing said passive face coupling interface flange against said active face coupling interface flange, said compressible struts of each of said at least three radial latches exert a force on said rocker arms to secure said passive face coupling interface flange to said active face coupling interface flange.

4. The radial latch interface mechanism according to claim 2, wherein each of said at least three radial latches includes said latch roller rotatably mounted to said rocker arm, such that rollers can roll along said passive coupling interface flange during extension or retraction of said at least three radial latches.

5. The radial latch interface mechanism according to claim 1, wherein said passive interface housing includes a pair of said radial latch alignment guides for each of said at least three radial latches.

6. The radial latch interface mechanism according to claim 1, wherein said active face coupling interface flange includes active coupling contact surfaces and said passive face coupling interface flange includes complementary passive coupling contact surfaces configured to mesh with said active coupling contact surfaces such that when active face coupling interface flange and passive face coupling interface flange are clamped together said active and passive face coupling interfaces form a rigid connection.

7. The radial latch interface mechanism according to claim 1, wherein said active interface assembly includes an active side electrical connector and said passive interface assembly includes a passive side electrical connector configured to connect to said active side electrical connector and form an electrical interface such that said electrical interface can transfer at least one of power, data, and video between said active interface assembly and said passive interface assembly.

8. The radial latch interface mechanism according to claim 7, wherein said active electrical connector has active side connector alignment features and said passive electrical connector has passive side connector alignment features that are complementary to said active side connector alignment features such that during coupling said active side connector alignment features engage said passive side connector alignment features to achieve fine alignment of said active and passive electrical connectors.

9. The radial latch interface mechanism according to claim 7, wherein said active electrical connector is attached to the distal end of said mobile inner housing and configured to form said electrical connection after said active and passive face coupling interfaces are clamped together.

10. The radial latch interface mechanism according to claim 9, wherein said active electrical connector includes cables that connect said active electrical connector to the robot system and said cables are enclosed within at least one telescoping cable guide, wherein each of said at least one telescoping cable guide includes an outer cable guide attached to drive plate and a complementary inner cable guide attached to said inner mobile housing, said inner cable guide configured to form a closed-sided tube with said outer cable guide such that said inner cable guide can translate longitudinally inside said outer cable guide responsive to the motion of said inner mobile housing with respect to said fixed outer active interface housing.

11. The radial latch interface mechanism according to claim 9, wherein said active side electrical connector is mounted on a connector mounting plate, said connector mounting plate attached to the distal end of said mobile inner housing by at least one compliant mount containing elastic material such that the normal force exerted on any object by said active side electrical connector is limited to the force generated by the at least one compliant mount(s).

12. The radial latch interface mechanism according to claim 7, wherein said passive interface housing includes a passive interface connector housing mounted facing said active interface assembly and said passive side electrical connector is mounted within said passive interface connector housing.

13. The radial latch interface mechanism according to claim 1, wherein said active interface housing is generally cylindrical and said mobile inner housing is generally cylindrical and positioned concentrically within said fixed outer active interface housing, said fixed outer active interface housing forming said longitudinal axis, wherein said passive interface housing includes a passive housing wall being generally cylindrical and its radius is the same as the radius of said fixed outer active interface housing, said passive face coupling interface flange extends inward from said passive housing wall such that said passive face coupling interface flange is generally circular and has a radius that is smaller than the radius of said passive housing wall, and wherein said first direction is toward said distal end of said fixed outer active interface housing and said second direction is toward said proximal end of said fixed outer active interface housing such that when said inner mobile housing is retracted toward said proximal end of said fixed outer active interface housing, said at least three radial latches retract and a latch radius decreases, and when said inner mobile housing is extended toward said distal end of said fixed outer active interface housing, said at least three radial latches extend and said latch radius increases such that said latch radius has a minimum radius that is smaller than the radius of said active face coupling interface and said latch radius has a maximum radius that is larger than the radius of said active face coupling interface.

14. The radial latch interface mechanism according to claim 1, further including at least one of sensors, cameras, and illumination devices.

15. The radial latch interface mechanism according to claim 1, wherein said first object is a robotic manipulator and said second object is one of a spacecraft and a payload.

* * * * *